US011217189B2

(12) United States Patent
Kimura

(10) Patent No.: US 11,217,189 B2
(45) Date of Patent: Jan. 4, 2022

(54) IMAGE PROCESSING DEVICE, DISPLAY APPARATUS, AND IMAGE PROCESSING METHOD FOR DISPLAY PANEL INCLUDING FRONT AND REAR LIQUID CRYSTAL CELLS

(71) Applicant: SONY CORPORATION, Tokyo (JP)

(72) Inventor: Hiroaki Kimura, Kanagawa (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/966,137

(22) PCT Filed: Dec. 13, 2018

(86) PCT No.: PCT/JP2018/045877
§ 371 (c)(1),
(2) Date: Jul. 30, 2020

(87) PCT Pub. No.: WO2019/155760
PCT Pub. Date: Aug. 15, 2019

(65) Prior Publication Data
US 2021/0027728 A1    Jan. 28, 2021

(30) Foreign Application Priority Data
Feb. 7, 2018 (JP) ............... JP2018-019983

(51) Int. Cl.
G09G 3/36 (2006.01)
G02F 1/1347 (2006.01)

(52) U.S. Cl.
CPC ....... G09G 3/3607 (2013.01); G02F 1/13471 (2013.01); G09G 2320/0242 (2013.01); G09G 2320/0271 (2013.01); G09G 2340/06 (2013.01)

(58) Field of Classification Search
CPC ......... G09G 3/3607; G09G 2320/0242; G09G 2300/023; G09G 2320/0271;
(Continued)

(56) References Cited

U.S. PATENT DOCUMENTS 8,482,499 B2 *  7/2013  Kimura ............... G09G 3/3611
                                                       345/87
2008/0088649 A1   4/2008  Ikeno et al.
(Continued)

FOREIGN PATENT DOCUMENTS

JP    2009-276425 A    11/2009
JP    2014-517931 A     7/2014
(Continued)

OTHER PUBLICATIONS

International Search Report dated Mar. 19, 2019 in PCT/JP2018/045877 filed Dec. 13, 2018, citing documents AA-AC and AP-AU therein, 2 pages.

Primary Examiner — Kwang-Su Yang
(74) Attorney, Agent, or Firm — Oblon, McClelland, Maier & Neustadt, L.L.P.

(57) ABSTRACT

A decrease in a color gamut in a low gradation region is reduced to improve image quality in a liquid crystal panel. Therefore, a color image signal for a liquid crystal display panel in which a display image is generated by light passing through a rear liquid crystal cell and a front liquid crystal cell is converted into a black-and-white image signal by using a predetermined coefficient. Then, the black-and-white image signal thus obtained is subjected to gradation value conversion so as to become a signal for performing gradation expression in a gradation region set as a gradation range in which a color gamut greatly changes in a case where the front liquid crystal cell is driven by the color image signal, and thus a rear image signal serving as the black-and-white image signal for the rear liquid crystal cell is generated.

(Continued)

Further, the color image signal is subjected to arithmetic processing by using the rear image signal, and thus a front image signal serving as the color image signal for the front liquid crystal cell is generated.

12 Claims, 12 Drawing Sheets

(58) Field of Classification Search
CPC ............. G09G 2360/16; G09G 5/02; G09G 2320/0666; G09G 2340/06; G02F 1/13471
See application file for complete search history.

(56) References Cited

U.S. PATENT DOCUMENTS

| | | |
|---|---|---|
| 2009/0147186 A1* | 6/2009 | Nakai .................. G09G 3/3406 349/74 |
| 2014/0049734 A1 | 2/2014 | Erinjippurath et al. |
| 2016/0180782 A1 | 6/2016 | Nakaya |
| 2018/0151103 A1 | 5/2018 | Koudo et al. |

FOREIGN PATENT DOCUMENTS

| | | |
|---|---|---|
| JP | 2015-191053 A | 11/2015 |
| JP | 2016-118685 A | 6/2016 |
| JP | 2018-84760 A | 5/2018 |
| WO | WO 2008/114521 A1 | 9/2008 |
| WO | WO 2008/117643 A1 | 10/2008 |
| WO | WO 2016/063675 A1 | 4/2016 |

\* cited by examiner

FIG. 2
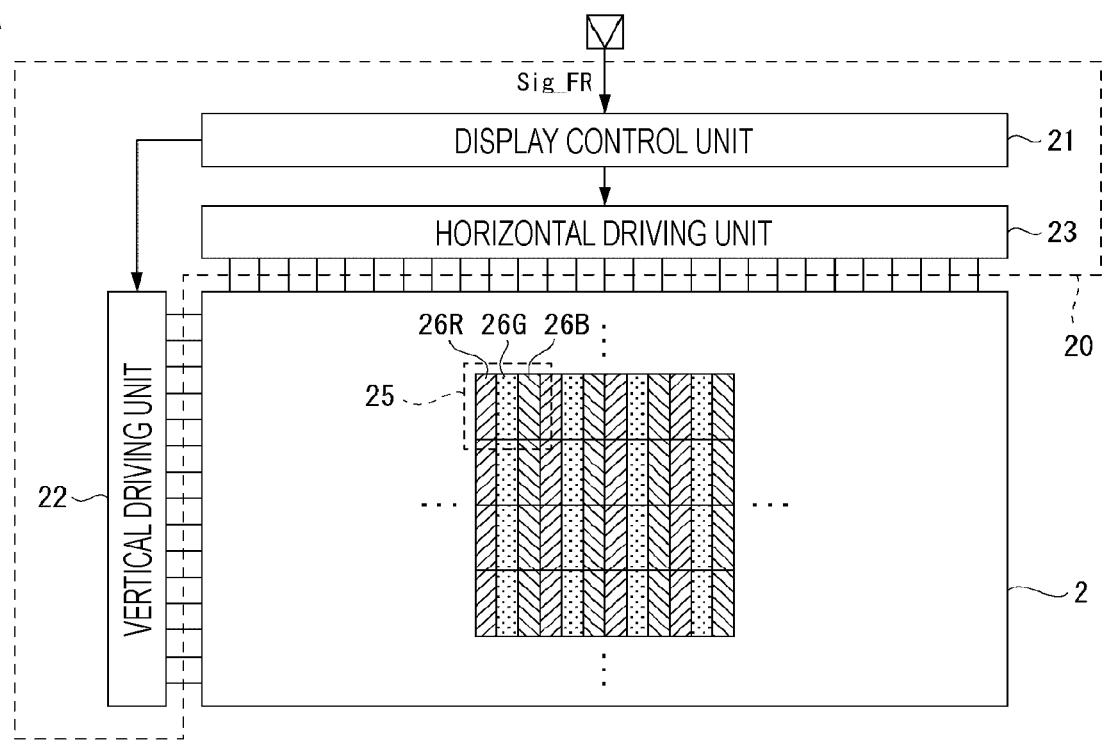
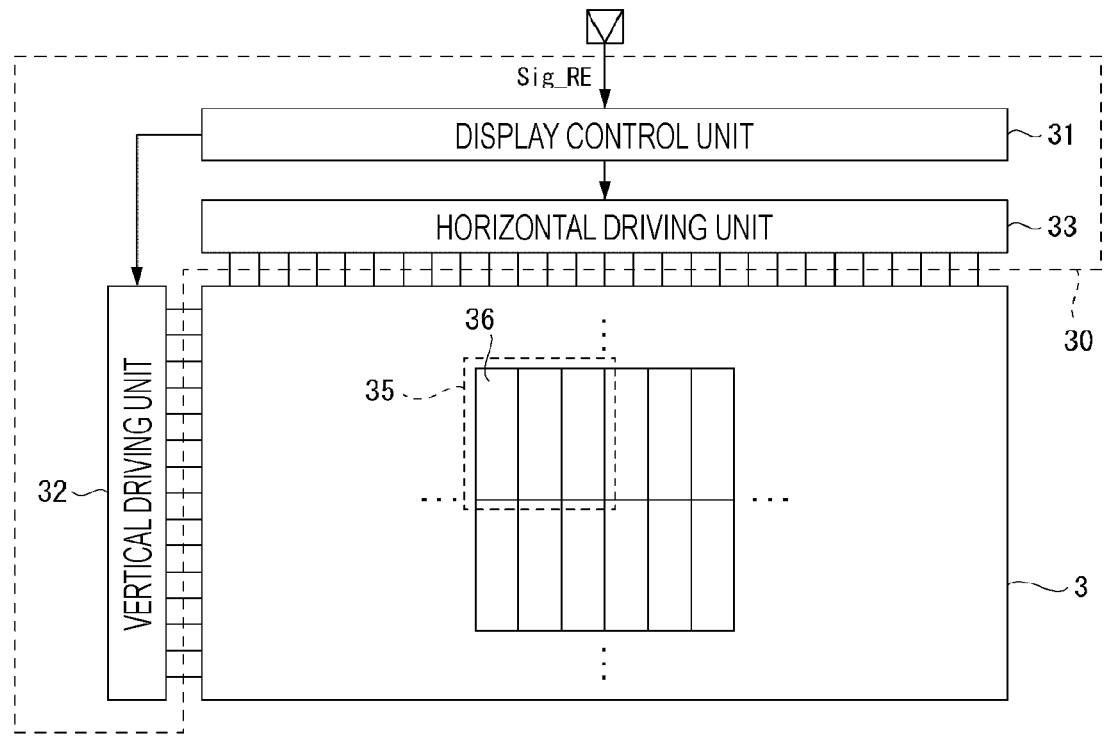

FIG. 10
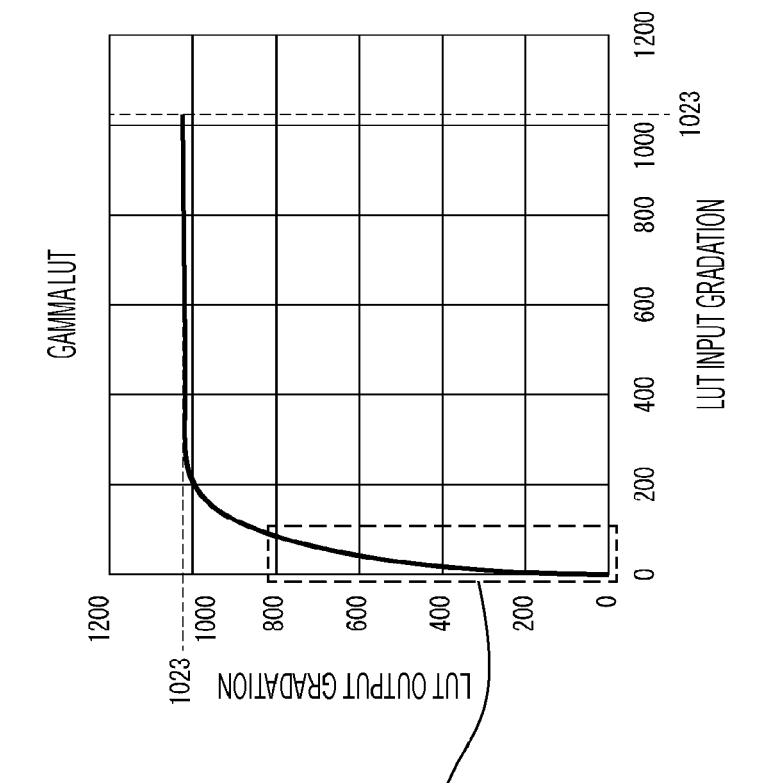
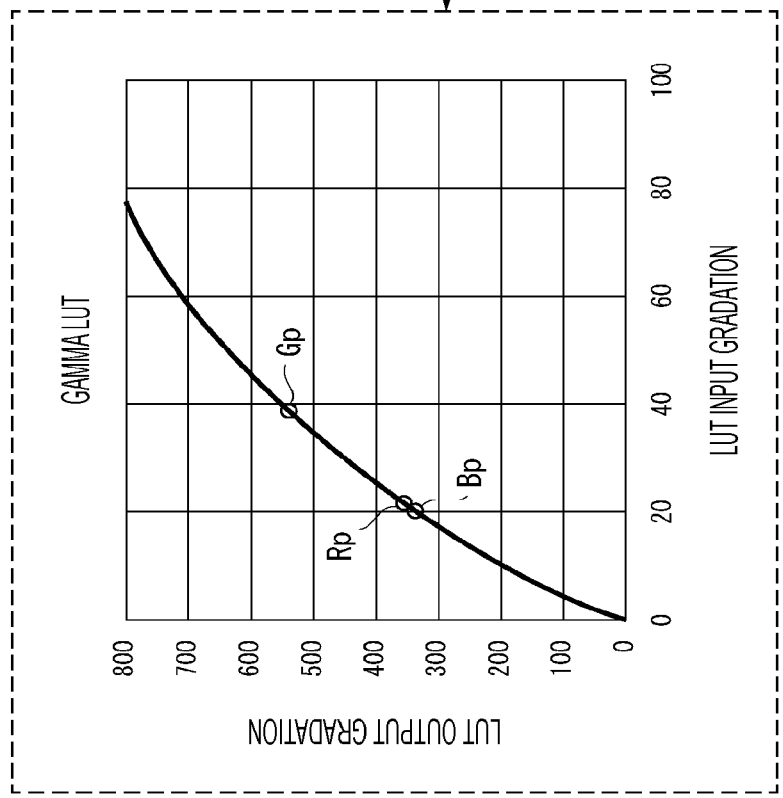

FIG. 11
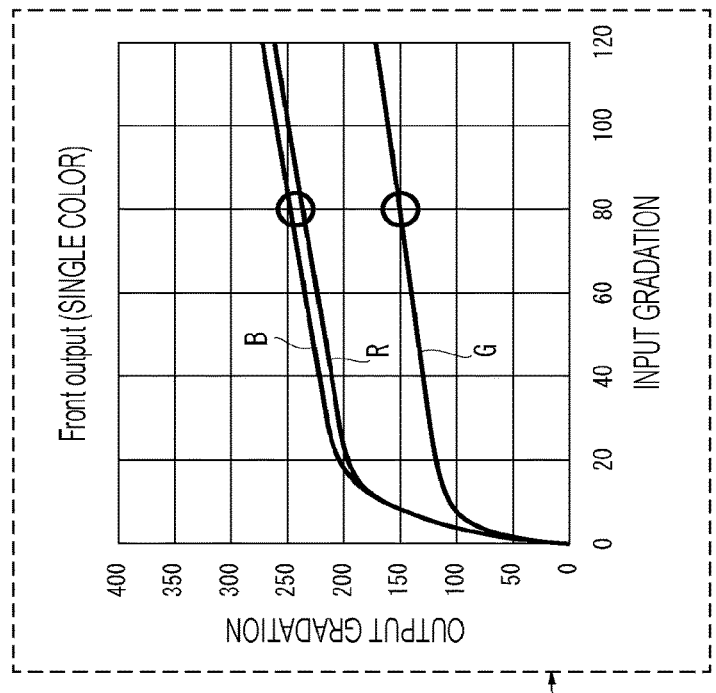
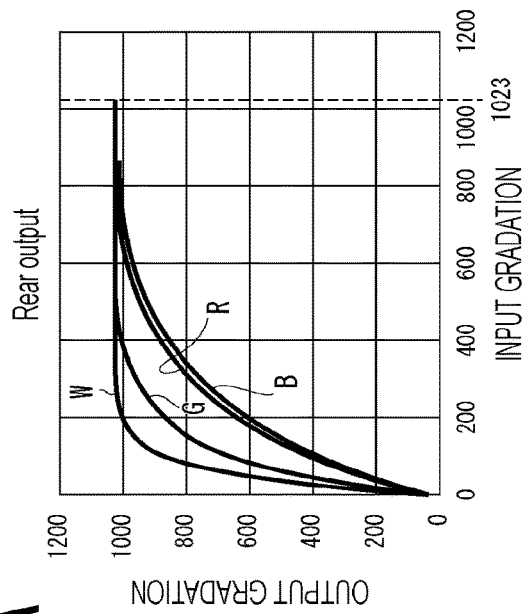
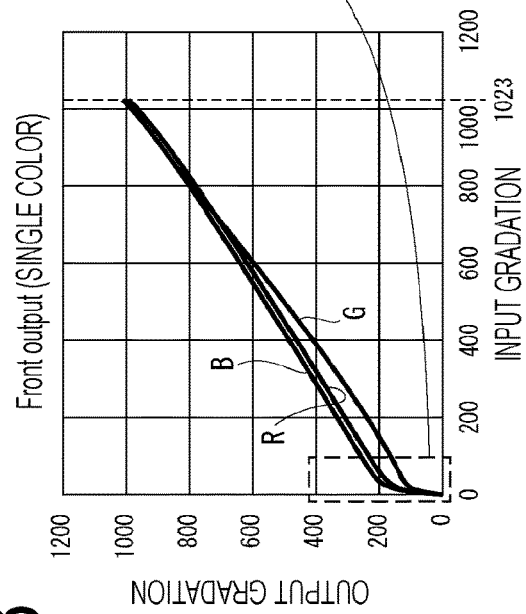

IMAGE PROCESSING DEVICE, DISPLAY APPARATUS, AND IMAGE PROCESSING METHOD FOR DISPLAY PANEL INCLUDING FRONT AND REAR LIQUID CRYSTAL CELLS

TECHNICAL FIELD

The present technology relates to an image processing device, a display apparatus, and an image processing method, and particularly relates to processing of an image signal for a display panel in which a display image is generated by light passing through a rear liquid crystal cell and a front liquid crystal cell.

BACKGROUND ART

Liquid crystal display apparatuses having various structures are known. As one of the structures, Patent Document 1 cited below discloses a dual-liquid-crystal-cell liquid crystal display apparatus.

CITATION LIST

Patent Document

Patent Document 1: Japanese Patent Application Laid-Open No. 2015-191053

SUMMARY OF THE INVENTION

Problems to be Solved by the Invention

A liquid crystal cell has a small amount of light leakage due to liquid crystal characteristics, and there is a phenomenon that a color gamut is narrower especially in low gradations than in high gradations due to mixing of red (R), green (G) and blue (B) spectra. This reduces image quality of an image to be displayed.

In a dual-liquid-crystal-cell display apparatus, contrast can be increased by controlling gradations in a rear liquid crystal cell. An object of the present technology is to maintain a color gamut in a low gradation region and improve image quality of an image to be displayed in a case where the dual-liquid-crystal-cell display apparatus is used.

Solutions to Problems

An image processing device according to the present technology includes: a black-and-white conversion unit that converts a color image signal into a black-and-white image signal by using a predetermined coefficient, the color image signal being a signal for a display panel in which a display image is generated by light passing through a rear liquid crystal cell and a front liquid crystal cell; a gradation value conversion unit that performs gradation value conversion so that the black-and-white image signal obtained in the black-and-white conversion unit serves as a signal for performing gradation expression in a gradation region set as a gradation range in which a color gamut greatly changes in a case where the front liquid crystal cell is driven by the color image signal, and generates a rear image signal serving as the black-and-white image signal for the rear liquid crystal cell; and a front image generation unit that performs arithmetic processing by using the rear image signal on the color image signal to generate a front image signal serving as the color image signal for the front liquid crystal cell.

The image signals to be processed by this image processing device are for a dual-liquid-crystal-cell liquid crystal display panel. The image processing device processes an image signal for each of the front liquid crystal cell and the rear liquid crystal cell of the dual-liquid-crystal-cell liquid crystal display panel. Meanwhile, the liquid crystal cell has a small amount of light leakage, and the color gamut is narrower especially in a low gradation region than in a high gradation region due to mixing of R, G, and B spectra. In view of this, the image processing device generates the rear image signal that performs gradation expression in a gradation region (for example, the low gradation region) in which the color gamut greatly changes in the front liquid crystal cell that displays a color image. The front image signal is subjected to arithmetic processing so as to form an appropriate image when being combined with a rear image based on the rear image signal.

In the image processing device according to the present technology described above, the black-and-white conversion unit may convert the color image signal into the black-and-white image signal by performing calculation using a coefficient calculated by using a lower limit value of a gradation value set for each color included in the color image signal.

That is, first, the lower limit value of the gradation value of each color (for example, R, G, or B) included in the color image signal is set. The lower limit value is a lower limit value of a gradation value of the front image signal. By using the lower limit value, the coefficient for converting a color image into a black-and-white image is set. The black-and-white conversion unit converts the color image signal into the black-and-white image signal by calculation using the coefficient.

In the image processing device according to the present technology described above, the color image signal may include gradation values of red, green, and blue, and the black-and-white conversion unit may convert the color image signal into the black-and-white image signal by performing calculation using coefficients of red, green, and blue, each of the coefficients being calculated by using a lower limit value of a gradation value set for each of red, green, and blue.

That is, the lower limit values of the gradation values of R, G, and B included in the color image signal are separately set. By using the lower limit values, the coefficients for the gradation values of R, G, and B for converting the color image into the black-and-white image are set. The black-and-white conversion unit converts the color image signal into the black-and-white image signal by calculation using the coefficients.

In the image processing device according to the present technology described above, the lower limit value may be a gradation value of each of red, green, and blue at which chromaticity changes to a predetermined value in a low gradation region.

For example, as gradation chromaticity of each of red, green, and blue, the gradation value whose chromaticity value is stable in the high gradation region and becomes the predetermined value in the low gradation region is set to the lower limit value.

In the image processing device according to the present technology described above, the gradation value conversion unit may perform gradation value conversion by using a lookup table in which an output value is stored for an input value.

That is, a gradation value of the rear image signal is obtained by referring to the lookup table (LUT) on the basis of a gradation value of the black-and-white image signal.

In the image processing device according to the present technology described above, the lower limit value of the gradation value of each color included in the color image signal and a target input gradation of the gradation value of the color image signal may be set, and the lookup table may be set so that, when the color image signal having the target input gradation of a single color is input, the front image signal becomes the lower limit value of the single color.

When the input color image signal includes the target input gradation of each single color R, G, or B, LUT conversion is performed so that the gradation values of the front image signal become the lower limit values of the respective single colors.

In the image processing device according to the present technology described above, the target input gradation may be set as a maximum gradation value in a low gradation region in which human eyes hardly perceive a change in chromaticity.

The target input gradation is a gradation in which the change in chromaticity in gradations lower than the target input gradation is hardly perceived.

In the image processing device according to the present technology described above, the front image generation unit may generate the front image signal by dividing the color image signal by the rear image signal.

That is, R, G, and B gradation values of the front image signal are obtained by, for example, dividing the gradation values of R, G, and B of the color image signal by the respective gradation values of the rear image signal.

In the image processing device according to the above-described present technology, the image processing device may further include a light amount correction unit that multiplies the rear image signal by a correction coefficient corresponding to a light amount component incident on the front liquid crystal cell, and the front image generation unit may generate the front image signal by dividing the color image signal by the rear image signal multiplied by the correction coefficient in the light amount correction unit.

That is, the R, G, and B gradation values of the front image signal are obtained by, for example, dividing the gradation values of R, G, and B of the color image signal by the respective gradation values of the rear image signal to which the correction coefficient is given in accordance with the light amount component incident on the front liquid crystal cell.

A display apparatus according to the present technology includes: a display panel in which a display image is generated by light passing through a rear liquid crystal cell and a front liquid crystal cell; and the above-described image processing device.

Further, in the display apparatus, the display panel may include a light source unit, the rear liquid crystal cell, a diffusion layer, and the front liquid crystal cell arranged in this order.

This forms a so-called dual-liquid-crystal-cell liquid crystal display panel. Such a dual-liquid-crystal-cell liquid crystal display panel is subjected to image processing for reducing a change in the color gamut in the low gradation region.

In an image processing method according to the present technology, a black-and-white conversion step, a gradation value conversion step, and a front image generation step are performed as processing performed by the black-and-white conversion unit, the gradation value conversion unit, and the front image generation unit in the above-described image processing device.

Effects of the Invention

The present technology reduces a change in color gamut caused by gradations and expands the color gamut in lower gradations, thereby improving image quality.

Note that the effects described herein are not necessarily limited, and any of the effects described in the present disclosure may be obtained.

BRIEF DESCRIPTION OF DRAWINGS

FIG. 2 is an explanatory diagram of a front liquid crystal cell and a rear liquid crystal cell according to an embodiment.

FIG. 10 is an explanatory diagram of a lookup table setting according to an embodiment.

FIG. 11 is an explanatory diagram of input/output characteristics of a rear liquid crystal cell and a front liquid crystal cell according to an embodiment.

MODE FOR CARRYING OUT THE INVENTION

Hereinafter, embodiments will be described in the following order.
<1. Configuration of display apparatus>
<2. Configuration of dual cell image processing unit>
<3. Improvement in color gamut in embodiment>
<4. Conclusion and modification example>

Note that, for the sake of description, the three primary colors of red, green, and blue are denoted by R, G, and B in alphabets, respectively.

<1. Configuration of Display Apparatus>

Figure 1:
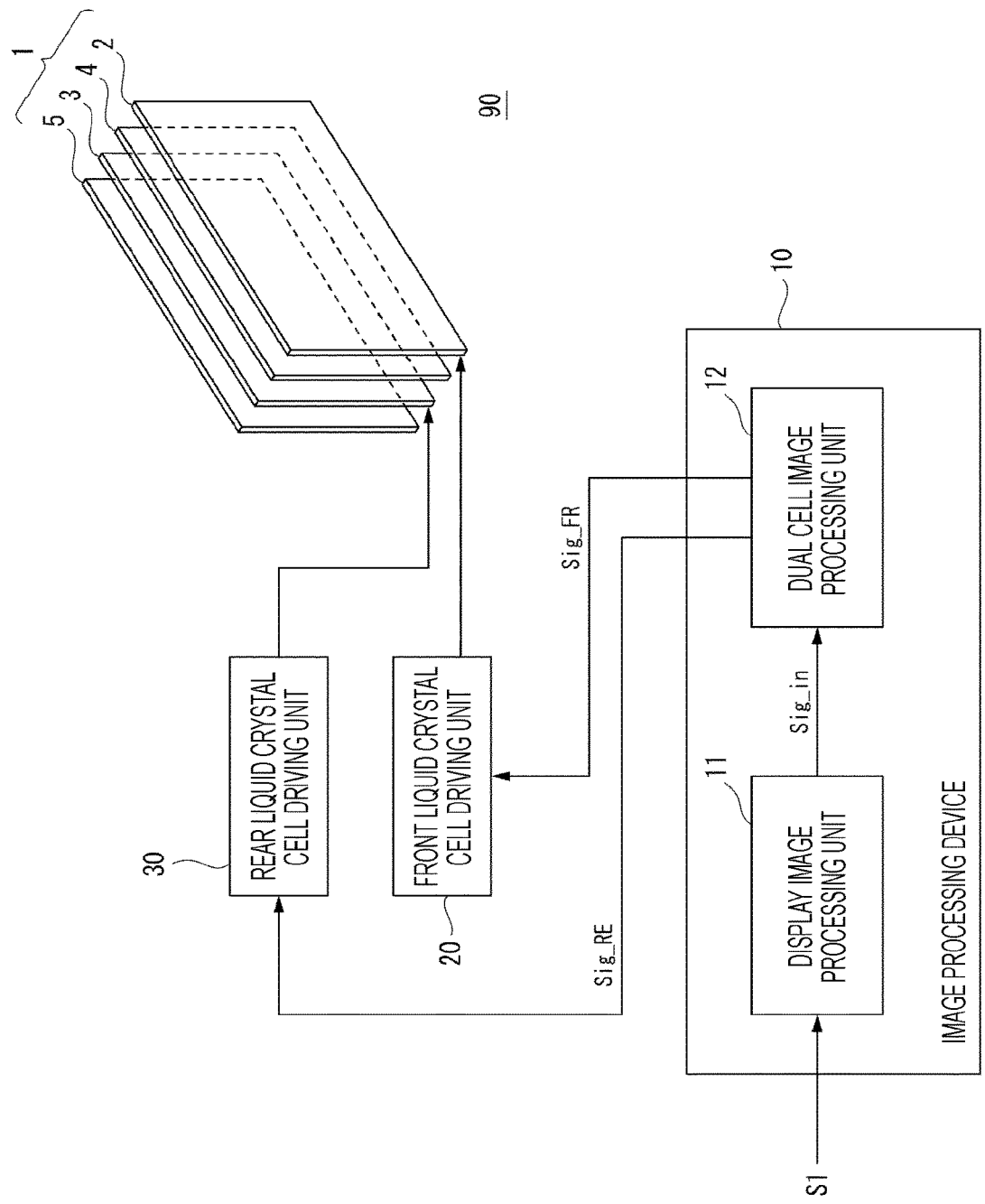
FIG. 1 is a block diagram of a display apparatus according to an embodiment of the present technology.

FIG. 1 illustrates a configuration of a display apparatus 90 according to an embodiment. The display apparatus 90 includes a liquid crystal display panel 1, an image processing device 10, a front liquid crystal cell driving unit 20, and a rear liquid crystal cell driving unit 30.

The liquid crystal display panel 1 is a dual-cell liquid crystal display panel, and includes a front liquid crystal cell 2, a diffusion layer 4, a rear liquid crystal cell 3, and a backlight 5.

On the front side of the backlight 5, the rear liquid crystal cell 3, the diffusion layer 4, and the front liquid crystal cell 2 are arranged in this order so as to be superimposed on each other, and a viewer sees an image displayed on the front side of the front liquid crystal cell 2.

The front liquid crystal cell 2 and the rear liquid crystal cell 3 each form a single liquid crystal display panel. In this embodiment, however, the entire dual-liquid-crystal-cell display panel will be referred to as "liquid crystal display panel 1".

The image processing device 10 performs signal processing of an image signal S1 input as a color image signal (for example, a signal in an ultra high definition (UHD) format or the like) for performing display on the liquid crystal display panel 1.

The image processing device 10 includes a display image processing unit 11 and a dual cell image processing unit 12.

The display image processing unit 11 performs necessary decoding processing, luminance processing, color processing, resolution conversion, and the like on the input image signal S1, and supplies a processed image signal Sig_in to the dual cell image processing unit 12. At least at that time, the image signal Sig_in is a color image signal indicating a gradation value of each of colors R, G, and B.

Although details will be described later, the dual cell image processing unit 12 performs processing corresponding to the dual-cell liquid crystal display panel 1.

That is, the dual cell image processing unit 12 performs signal processing on the input image signal Sig_in, thereby generating and outputting an image signal (front image signal Sig_FR) for the front liquid crystal cell 2 and an image signal (rear image signal Sig_RE) for the rear liquid crystal cell 3.

The front image signal Sig_FR is a color image signal including gradation values of R, G, and B. Meanwhile, the rear image signal Sig_RE is a black-and-white (grayscale) image signal including a grayscale gradation value.

The front image signal Sig_FR is supplied to the front liquid crystal cell driving unit 20. The front liquid crystal cell driving unit 20 drives the front liquid crystal cell 2 on the basis of the front image signal Sig_FR to display a color image.

The rear image signal Sig_RE is supplied to the rear liquid crystal cell driving unit 30. The rear liquid crystal cell driving unit 30 drives the rear liquid crystal cell 3 on the basis of the rear image signal Sig_RE to display a black-and-white image.

FIG. 2A illustrates an example of structures of the front liquid crystal cell driving unit 20 and the front liquid crystal cell 2.

The front liquid crystal cell driving unit 20 includes a display control unit 21, a vertical driving unit 22, and a horizontal driving unit 23, and drives the front liquid crystal cell 2 with those configurations.

The display control unit 21 supplies a control signal to the vertical driving unit 22 and also supplies an image signal (a signal corresponding to the gradation values of R, G, and B) and a control signal to the horizontal driving unit 23 on the basis of the front image signal Sig_FR, and performs control so that the vertical driving unit 22 and the horizontal driving unit 23 operate in synchronization with each other.

Based on the control signal supplied from the display control unit 21, the vertical driving unit 22 sequentially selects one horizontal line to be driven for display in the front liquid crystal cell 2.

Based on the image signal and the control signal supplied from the display control unit 21, the horizontal driving unit 23 generates a pixel voltage for one horizontal line and supplies the pixel voltage to subpixels 26 (26R, 26G, and 26B) for the one horizontal line selected by the vertical driving unit 22.

In the front liquid crystal cell 2, a plurality of pixels 25 is arranged in a matrix.

Each pixel 25 includes three subpixels 26R, 26G, and 26B.

The subpixel 26R includes a red color filter, the subpixel 26G includes a green color filter, and the subpixel 26B includes a blue color filter.

The pixel voltage is supplied from the horizontal driving unit 23 to each of the subpixels 26R, 26G, and 26B. In addition, the subpixels 26R, 26G, and 26B change light transmittance in accordance with the pixel voltage.

FIG. 2B illustrates an example of structures of the rear liquid crystal cell driving unit 30 and the rear liquid crystal cell 3.

The rear liquid crystal cell driving unit 30 includes a display control unit 31, a vertical driving unit 32, and a horizontal driving unit 33, and drives the rear liquid crystal cell 3 with those configurations.

The display control unit 31 supplies a control signal to the vertical driving unit 32 and also supplies an image signal (a signal corresponding to a grayscale gradation value) and a control signal to the horizontal driving unit 33 on the basis of the rear image signal Sig_RE, and performs control so that the vertical driving unit 32 and the horizontal driving unit 33 operate in synchronization with each other.

Based on the control signal supplied from the display control unit 31, the vertical driving unit 32 sequentially selects one horizontal line to be driven for display in the rear liquid crystal cell 3.

Based on the image signal and the control signal supplied from the display control unit 31, the horizontal driving unit 33 generates a pixel voltage for one horizontal line and supplies the pixel voltage to subpixels 36 for the one horizontal line selected by the vertical driving unit 32.

In the rear liquid crystal cell 3, a plurality of pixels 35 is arranged in a matrix.

Each pixel 35 includes three subpixels 36. Each subpixel 36 includes no color filter. That is, the subpixels 26R, 26G, and 26B in the front liquid crystal cell 2 include color filters of the corresponding colors, respectively, but each subpixel 36 in the rear liquid crystal cell 3 includes no color filter.

The same pixel voltage is supplied from the horizontal driving unit 33 to the three subpixels 36 belonging to one pixel 35. In addition, each subpixel 36 changes light transmittance in accordance with the pixel voltage.

Note that the pixel 35 of the rear liquid crystal cell 3 may include the above three subpixels as one electrode and one pixel of a black matrix. That is, the pixel 35 may include no color filter, and, in addition, may include no subpixel as to liquid crystal structural elements such as a thin film transistor (TFT), a transparent electrode, wiring, and a black matrix. In that case, one pixel 35 corresponds to the three subpixels 26R, 26G, and 26B in the front liquid crystal cell 2.

Such a rear liquid crystal cell 3 can be manufactured by omitting a color filter forming step from a manufacturing step of a general-purpose liquid crystal display panel capable of displaying a color image. This makes it possible to reduce development costs and manufacturing costs of the display apparatus 90, as compared with a case where a dedicated product is developed.

The backlight 5 of FIG. 1 emits light on the basis of a backlight control signal (not illustrated). The backlight 5 is arranged on the rear side of the rear liquid crystal cell 3.

The backlight 5 includes, for example, a light emitting unit using a light emitting diode (LED) to emit light.

Figure 3:
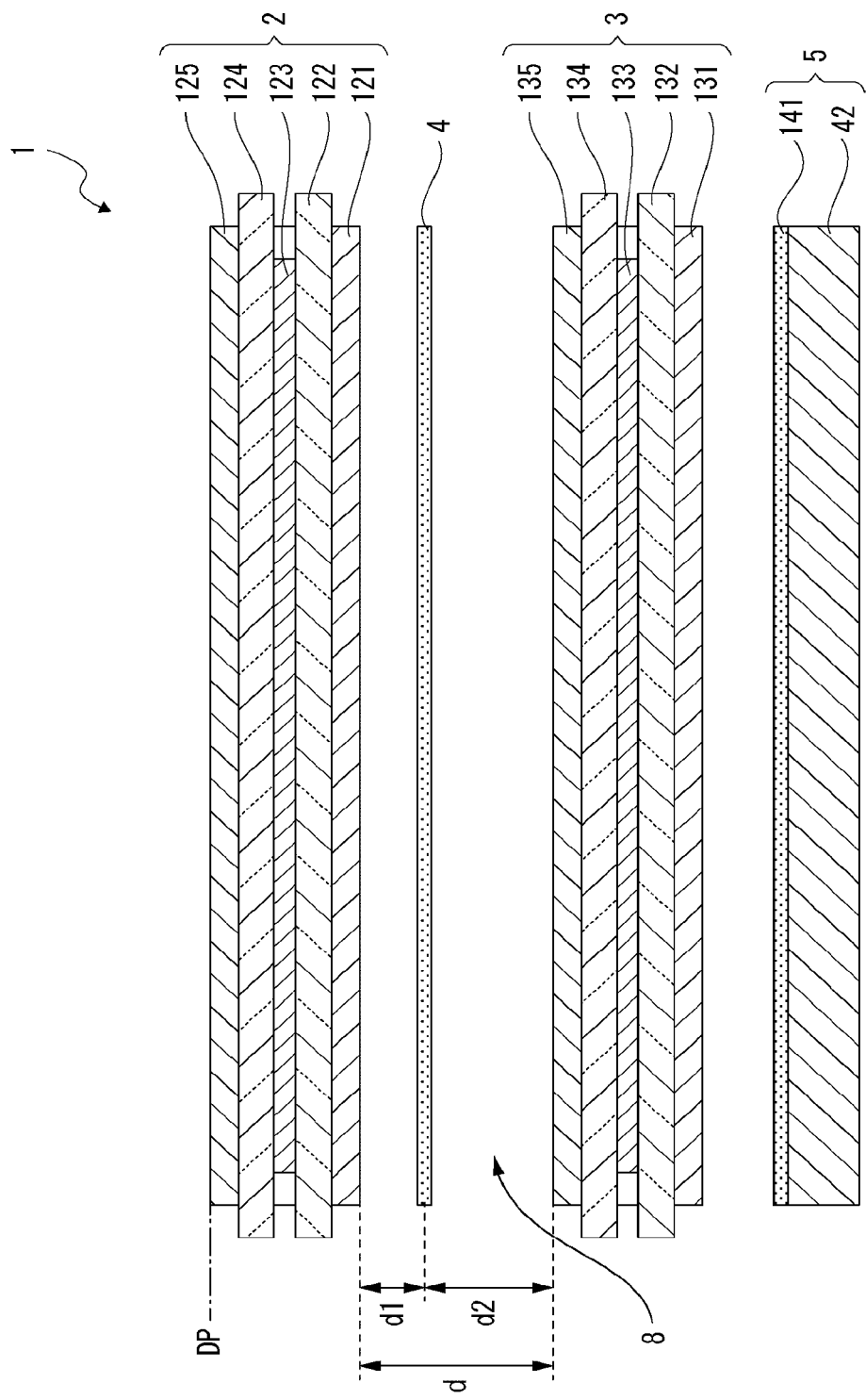
FIG. 3 is an explanatory diagram of arrangement of a liquid crystal display panel according to an embodiment.

FIG. 3 illustrates an arrangement configuration of the liquid crystal display panel 1.

As illustrated in FIG. 3, the liquid crystal display panel 1 includes the backlight 5, the rear liquid crystal cell 3, the diffusion layer 4, and the front liquid crystal cell 2 arranged in this order, and an upper surface of the front liquid crystal cell 2 in FIG. 3 serves as a display surface DP.

That is, light emitted from the backlight 5 passes through the backlight 5, the rear liquid crystal cell 3, the diffusion layer 4, and the front liquid crystal cell 2 in order and reaches the viewer.

The front liquid crystal cell 2 and the rear liquid crystal cell 3 are separate from each other. In addition, the diffusion layer 4 is arranged in a gap 8 between the front liquid crystal cell 2 and the rear liquid crystal cell 3.

The front liquid crystal cell 2 includes substrates 122 and 124, a liquid crystal layer 123, and polarizing plates 121 and 125.

The substrates 122 and 124 are made from, for example, a glass substrate, and are arranged to face each other.

A pixel electrode is formed for each subpixel 26 on a surface of the substrate 122, the surface facing the substrate 124, and a pixel voltage is applied thereto by the above-described horizontal driving unit 23.

An electrode common to each subpixel 26 is formed on a surface of the substrate 124, the surface facing the substrate 122. Further, a color filter and a black matrix are formed on the substrate 124.

The liquid crystal layer 123 is sealed between the substrate 122 and the substrate 124, and changes light transmittance in accordance with the pixel voltage applied to the pixel electrode of the substrate 122. The polarizing plate 121 is attached to the light incident side of the substrate 122, and the polarizing plate 125 is attached to the light emitting side of the substrate 124. A transmission axis of the polarizing plate 121 and a transmission axis of the polarizing plate 125 intersect each other.

The rear liquid crystal cell 3 includes substrates 132 and 134, a liquid crystal layer 133, and polarizing plates 131 and 135.

The substrates 132 and 134 are made from, for example, a glass substrate, and are arranged to face each other.

A pixel electrode is formed for each subpixel 36 on a surface of the substrate 132, the surface facing the substrate 134, and a pixel voltage is applied thereto by the above-described horizontal driving unit 33.

Note that there is a structure including no subpixel as described above. In that case, a pixel electrode is formed for each pixel 35.

An electrode common to each subpixel 36 is formed on a surface of the substrate 134, the surface facing the substrate 132. Further, a black matrix is formed on the substrate 134. In addition, unlike the substrate 124 of the front liquid crystal cell 2, no color filter is formed on the substrate 134.

The liquid crystal layer 133 is sealed between the substrate 132 and the substrate 134, and changes light transmittance in accordance with the pixel voltage applied to the pixel electrode of the substrate 132.

The polarizing plate 131 is attached to the light incident side of the substrate 132, and the polarizing plate 135 is attached to the light emitting side of the substrate 134. A transmission axis of the polarizing plate 131 and a transmission axis of the polarizing plate 135 intersect each other.

The diffusion layer 4 diffuses light incident from the rear liquid crystal cell 3 side. The diffusion layer 4 can be, for example, a diffusion film in which beads are randomly scattered on a resin film or in the resin film.

The diffusion layer 4 is for reducing moire in a display image. That is, moire may be generated in a display image in the liquid crystal display panel 1 because the front liquid crystal cell 2 and the rear liquid crystal cell 3 that are two liquid crystal display panels are arranged to be superimposed on each other. Therefore, the diffusion layer 4 is arranged between the front liquid crystal cell 2 and the rear liquid crystal cell 3 in the liquid crystal display panel 1, thereby reducing moire and suppressing deterioration in image quality.

The diffusion layer 4 may be arranged at any position in the gap 8, but is desirably arranged on the side close to the front liquid crystal cell 2 as illustrated in FIG. 3. That is, in an inter-panel distance d, a distance d1 between the diffusion layer 4 and the front liquid crystal cell 2 is desirably smaller than a distance d2 between the diffusion layer 4 and the rear liquid crystal cell 3 (d1<d2).

In this case, a transparent material layer may be formed between the diffusion layer 4 and the front liquid crystal cell 2 and/or between the diffusion layer 4 and the rear liquid crystal cell 3.

Further, the diffusion layer 4 is more desirably arranged to be adjacent to the front liquid crystal cell (d1=0). This is because moire can be suppressed more effectively and sharpness can be improved as the diffusion layer 4 is closer to the front liquid crystal cell 2.

Moire can be suppressed more effectively as a degree of diffusion (haze value) of the diffusion layer 4 is higher. For example, in a case where the haze value is 90% or more, it is possible to improve a degree of freedom in designing the inter-panel distance d for obtaining desired image quality. However, when the haze value is increased, reduction in luminance is concerned. Therefore, it is desirable to reduce resolution of the rear liquid crystal cell 3 and eliminate the color filter from the rear liquid crystal cell 3.

Further, even in a case where the diffusion layer 4 has a low haze value, it is possible to obtain desirable image quality by, for example, arranging the diffusion layer 4 close to the front liquid crystal cell 2.

The backlight 5 includes not only a light emitting array 42 but also a diffusion plate 141. The diffusion plate 141 diffuses light emitted from the light emitting array 42.

The light emitting array 42 is formed by arraying LEDs, for example.

<2. Configuration of Dual Cell Image Processing Unit>

A configuration of the dual cell image processing unit 12 will be described with reference to FIGS. 4 and 5.

Figure 4:
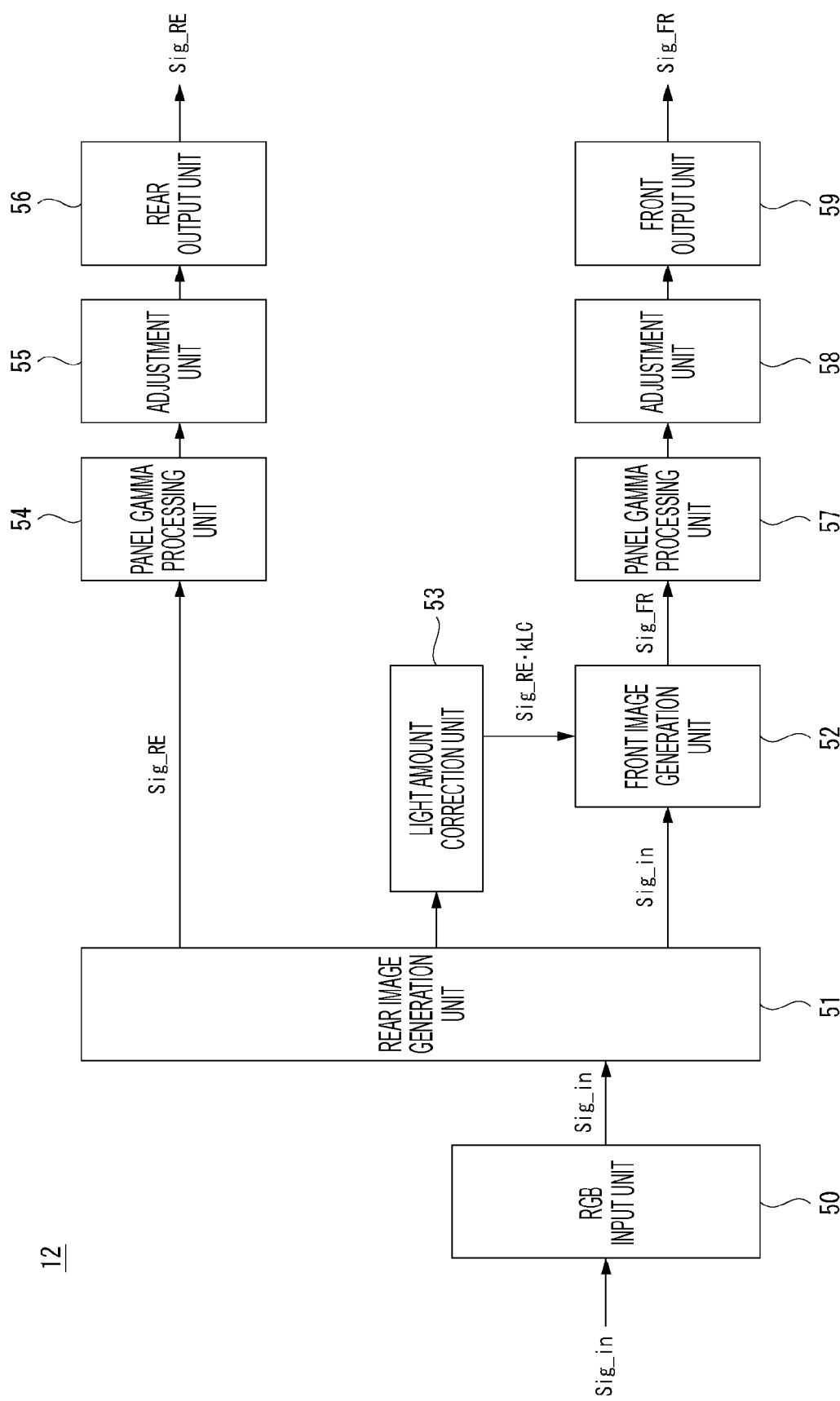
FIG. 4 is a block diagram of a dual cell image processing unit according to an embodiment.
Figure 5:
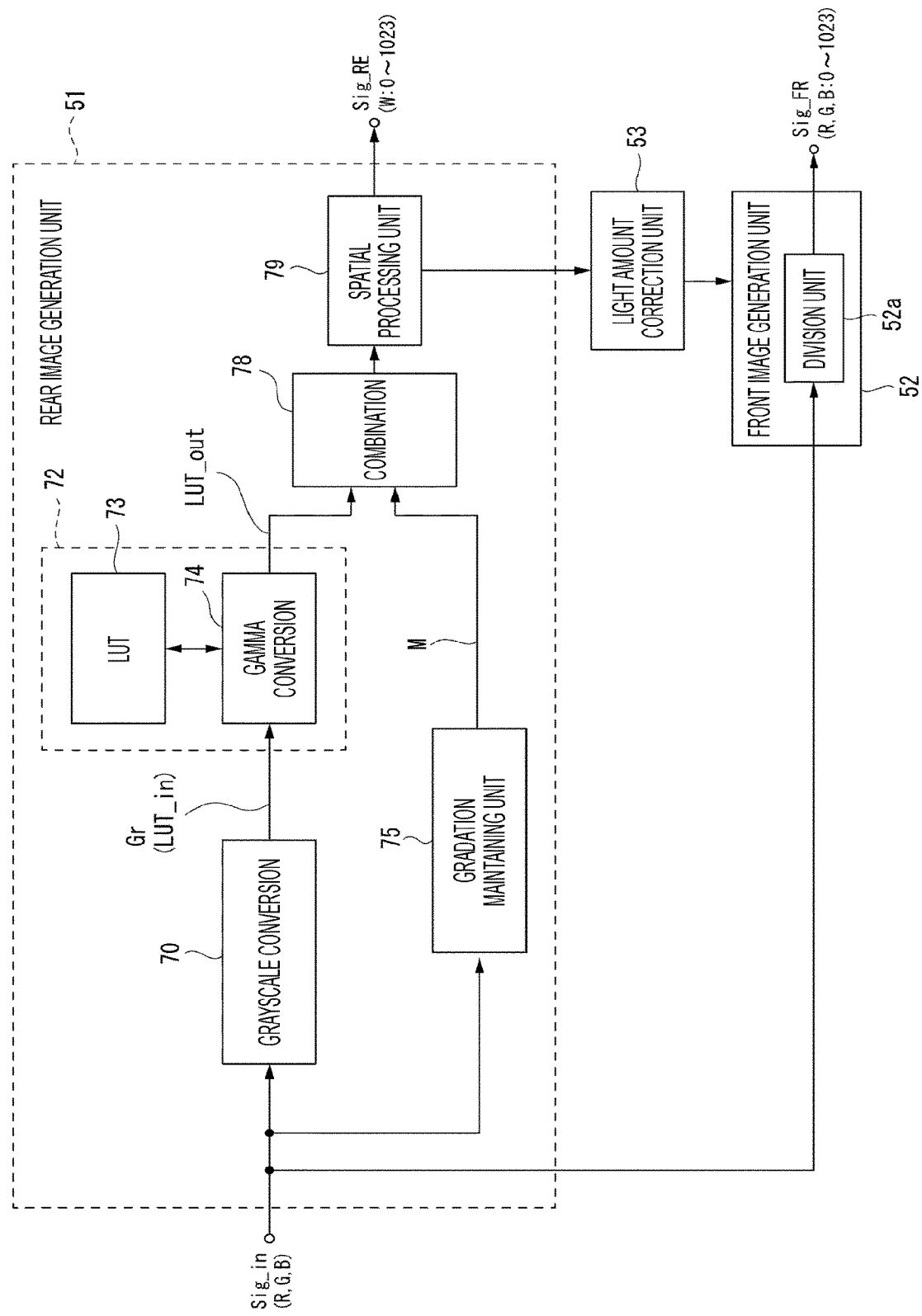
FIG. 5 is a block diagram of a main part of a dual cell image processing unit according to an embodiment.

FIG. 4 is a block diagram of the dual cell image processing unit 12, and FIG. 5 is a block diagram illustrating inside of a rear image generation unit 51 of FIG. 4 in detail.

As illustrated in FIG. 4, the dual cell image processing unit 12 includes an RGB input unit 50, the rear image generation unit 51, a front image generation unit 52, a light amount correction unit 53, panel gamma processing units 54 and 57, adjustment units 55 and 58, a rear output unit 56, and a front output unit 59.

The image signal Sig_in from the display image processing unit 11 is input to the RGB input unit 50, and is supplied from the RGB input unit 50 to the rear image generation unit 51.

The image signal Sig_in is, for example, a signal of 1024 gradations of 10 bits for each of R, G, and B. As a matter of course, the signal of 1024 gradations (10 bits) is merely an example for convenience of description, and a signal having a smaller or larger number of gradations (bit length) may be used.

The rear image generation unit 51 generates the rear image signal Sig_RE in processing described later. The rear image signal Sig_RE is, for example, a signal of 1024 gradations (10 bits: 0 to 1023) of white (W).

The rear image signal Sig_RE is subjected to gamma processing corresponding to the rear liquid crystal cell 3 in the panel gamma processing unit 54, and is then subjected to necessary adjustment processing in the adjustment unit 55. Then, the rear image signal Sig_RE is subjected to delay adjustment processing, parallelization corresponding to the three subpixels 36, and the like in the rear output unit 56 and is then supplied to the rear liquid crystal cell driving unit 30.

Note that, in a case where no subpixel is formed in the rear liquid crystal cell 3 as described above, the rear image signal Sig_RE is output corresponding to the front image signal Sig_FR at three timings corresponding to the three subpixels 26R, 26G, and 26B in the front liquid crystal cell 2.

The rear image signal Sig_RE generated in the rear image generation unit 51 is also supplied to the light amount correction unit 53. The light amount correction unit 53 multiplies the rear image signal Sig_RE by a light amount correction coefficient kLC for correcting a light amount component incident on the front liquid crystal cell 2, and outputs the multiplied signal to the front image generation unit 52.

The light amount correction coefficient kLC is, for example, a fixed value. However, the light amount correction coefficient kLC may be a variable value. For example, the light amount correction coefficient kLC may be adaptively calculated in accordance with an image.

The image signal Sig_in is supplied to the front image generation unit 52. The front image generation unit 52 includes a division unit 52a as illustrated in FIG. 5, and generates a front image signal Sig_FR by dividing the input image signal Sig_in by the rear image signal Sig_RE.

In a case of the dual-cell liquid crystal display panel 1, an image in which an image in the rear liquid crystal cell 3 and an image in the front liquid crystal cell 2 are combined is visually recognized as a display image. That is, an image in which the luminance in the rear liquid crystal cell 3 and the luminance in the front liquid crystal cell 2 are multiplied is displayed. Therefore, when the luminance of the front image signal Sig_FR is divided by the luminance of the rear image signal Sig_RE, it is possible to perform display according to the luminance of the original image signal Sig_in for each pixel. For such a reason, the front image signal Sig_FR is generated by dividing the image signal Sig_in by the rear image signal Sig_RE.

However, in actuality, a light amount difference is generated between light emitted from the rear liquid crystal cell 3 and light incident on the front liquid crystal cell 2, and thus, to be exact, it is necessary to perform correction instead of simple division. Thus, the rear image signal Sig_RE is corrected in the light amount correction unit 53 (Sig_RE·kLC).

Therefore, the front image generation unit 52 (division unit 52a) calculates the front image signal Sig_FR as follows:

$$Sig\_FR = Sig\_in / (Sig\_RE \cdot kLC).$$

Herein, the image signal Sig_in is a signal including gradation values Sig_in(R), Sig_in(G), and Sig_in(B) of R, G, and B. Thus, more specifically, gradation values Sig_FR(R), Sig_FR(G), and Sig_FR(B) of R, G, and B of the front image signal Sig_FR are generated as follows:

$$Sig\_FR(R) = Sig\_in(R) / (Sig\_RE \cdot kLC)$$

$$Sig\_FR(G) = Sig\_in(G) / (Sig\_RE \cdot kLC)$$

$$Sig\_FR(B) = Sig\_in(B) / (Sig\_RE \cdot kLC).$$

Each of the gradation values Sig_FR(R), Sig_FR(G), and Sig_FR(B) of R, G, and B is, for example, a signal of 1024 gradations (0 to 1023) of 10 bits.

Note that, in a case where the liquid crystal display panel 1 is less necessary to perform light amount correction or in other cases, Sig_FR=Sig_in/Sig_RE may be calculated, without providing the light amount correction coefficient kLC.

The front image signal Sig_FR generated in the front image generation unit 52 is subjected to gamma processing corresponding to the front liquid crystal cell 2 in the panel gamma processing unit 57 of FIG. 4, and is then subjected to necessary adjustment processing in the adjustment unit 58. Then, the front image signal Sig_FR is subjected to parallelization and the like corresponding to the three subpixels 26R, 26G, and 26B in the front output unit 59 and is then supplied to the front liquid crystal cell driving unit 20.

A configuration inside the rear image generation unit 51 will be described with reference to FIG. 5.

The rear image generation unit 51 converts the image signal Sig_in that is the input color image signal into a grayscale signal (black-and-white image signal) Gr in a grayscale conversion unit 70.

Grayscale conversion is performed by using coefficients kR, kG, and kB as follows:

$$Gr = kR \cdot Sig\_in(R) + kG \cdot Sig\_in(G) + kB \cdot Sig\_in(B).$$

That is, the coefficient kR for R, the coefficient kG for G, and the coefficient kB for B are multiplied by the respective gradation values Sig_in(R), Sig_in(G), and Sig_in(B) of R, G, and B included in the image signal Sig_in. Then, the resultant values are added to become the grayscale signal Gr. The grayscale signal Gr has a gradation value (0 to 1023) as white (W).

Note that a method of setting the coefficients kR, kG, and kB will be described later.

Such a grayscale signal Gr is supplied to a gradation conversion unit 72 and is subjected to gradation value conversion.

The gradation conversion unit 72 includes a lookup table (LUT) 73 and a gamma conversion unit 74. The gamma conversion unit 74 refers to the LUT 73 by using the gradation value of the input grayscale signal Gr as an LUT input signal LUT_in, thereby obtaining a corresponding output gradation value (LUT output signal LUT_out). Then, the output gradation value (LUT output signal LUT_out) is supplied to a combination unit 78.

In the gradation conversion unit 72, the grayscale signal Gr is subjected to the gradation value conversion so as to become a signal for performing gradation expression in a gradation region set as a gradation range in which the color gamut greatly changes in a case where the front liquid crystal cell 2 is driven by the color image signal.

Although the setting of the LUT 73 will be described later, in this embodiment, the color gamut expansion in the low gradation region is realized particularly by the coefficients kR, kG, and kB used in the grayscale conversion unit 70 and the gradation value conversion in the LUT 73.

Note that, in the rear image generation unit 51, a gradation maintaining unit 75 is provided for gradation reproduction at the time of a high gradation.

The gradation maintaining unit 75 detects a maximum value among the gradation values Sig_in(R), Sig_in(G), and Sig_in(B) of R, G, and B, respectively, in the image signal Sig_in, and performs predetermined processing on the detected maximum value, thereby generating a signal M. The signal M is supplied to the combination unit 78.

In the combination unit 78, regarding the image signal Sig_in at a certain point in time, a gradation value of the signal M and the gradation value of the LUT output signal LUT_out are supplied at the same timing, and the larger gradation value therebetween is selected and serves as the gradation value of the rear image signal Sig_RE.

Output (rear image signal Sig_RE) of the combination unit 78 is processed by a spatial processing unit 79 and is then output from the rear image generation unit 51.

From this, roughly speaking, in a case where the image signal Sig_in for a pixel in the high gradation region is input, the gradation value of the signal M tends to be reflected in the rear image signal Sig_RE, and, in a case where the image signal Sig_in for a pixel in the low gradation region is input, the gradation value of the LUT output signal LUT_out tends to be reflected in the rear image signal Sig_RE. However, this cannot be unconditionally said because the output gradation value of the LUT 73 does not simply correspond to the gradation of the image signal Sig_in.

The signal M is used because there is a possibility that, for example, in a case where a signal of 1023 gradations of a single color R is input or in other cases, the signal is not returned to 1023 gradations due to the grayscale conversion and the conversion using the LUT 73. This depends on settings of the coefficients kR, kG, and kB and the LUT 73.

For such a case, in order to maintain a gradation performance, the signal M based on the maximum value is used in some cases.

<3. Improvement in Color Gamut in Embodiment>

Processing of the dual cell image processing unit 12 having the above configuration, in particular, improvement in the color gamut in the low gradation region realized by processing of the rear image generation unit 51 will be described.

As described above, one liquid crystal cell has a small amount of light leakage due to liquid crystal characteristics, and therefore cannot reproduce perfect black.

Figure 6:
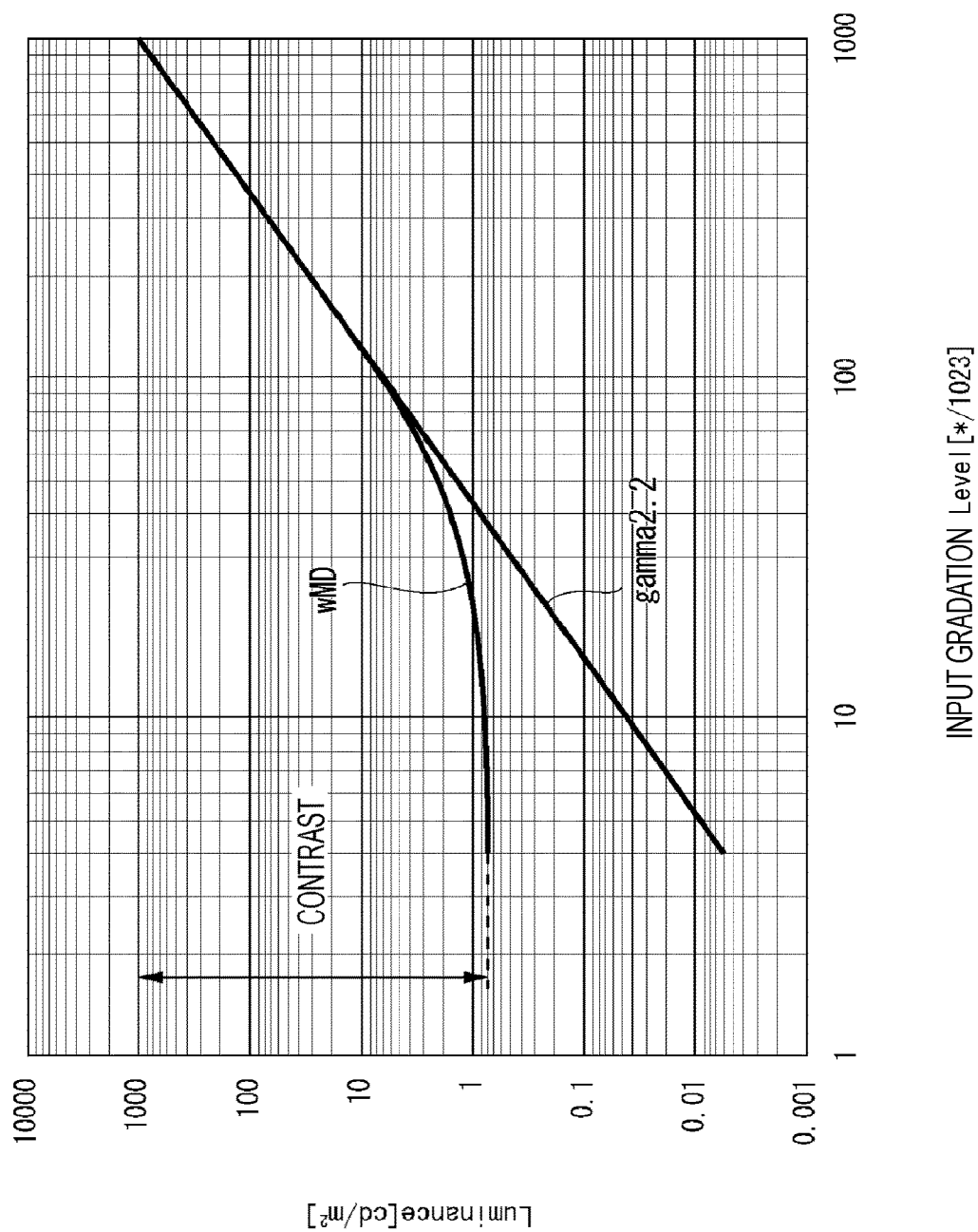
FIG. 6 is an explanatory diagram of a liquid crystal caused by light leakage in a low gradation region.

FIG. 6 illustrates a measured value wMD of luminance of white (W) of one liquid crystal cell and a curve of gamma of 2.2, where a horizontal axis shows an input gradation and a vertical axis shows luminance ([cd/m$^2$]).

Note that "W" herein is a case where an R gradation, a G gradation, and a B gradation are the same. For example, the measured value of the luminance obtained when the R gradation value=the G gradation value=the B gradation value="10" is a luminance value obtained in a case where an input gradation value is "10". The gradation on the horizontal axis shows a range of 0 to 1000 out of 1024 gradations of 0 to 1023 on the assumption of, for example, 10-bit data.

In terms of performance, the curve of the measured value wMD preferably matches the gamma of 2.2. However, the luminance is not sufficiently reduced in the low gradation region as illustrated in FIG. 6. This indicates that lower luminance cannot be obtained due to light leakage.

In addition, original gradation cannot be output in the low gradation as described above, which results in a decrease in contrast.

Figure 7:
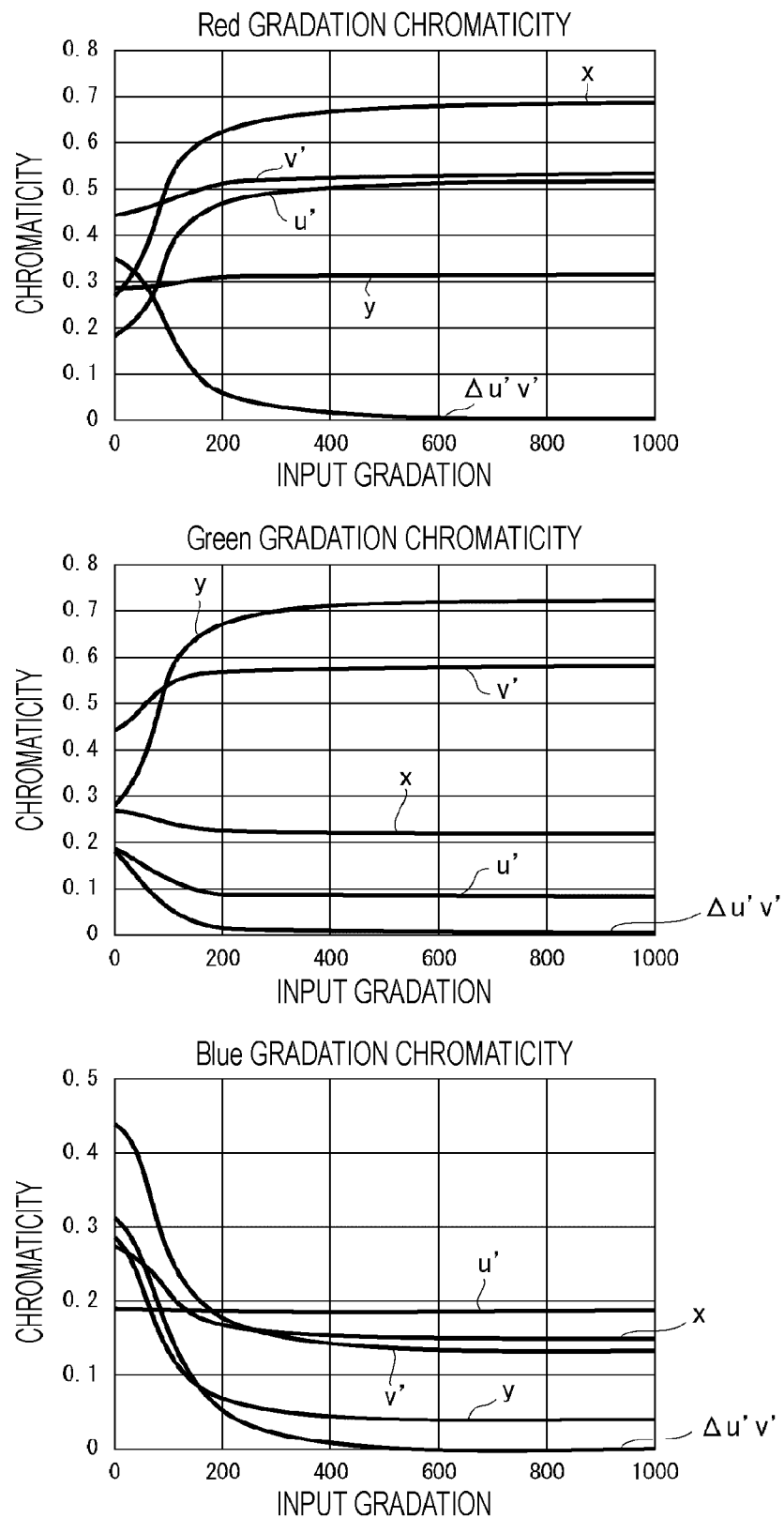
FIG. 7 is an explanatory diagram of a relationship between gradation and chromaticity of each of R, G, and B.

Further, a change in chromaticity is increased (the color gamut is decreased) at the time of a low gradation due to this light leakage, and characteristics of R, G, and B differ from each other in some cases as illustrated in FIG. 7.

FIG. 7 illustrates a change in chromaticity with respect to a gradation at the time of outputting each of the single colors R, G, and B by using a value of each of x, y, u', v', and Δu'v' as axes of a chromaticity diagram. A horizontal axis shows an input gradation, which indicates a range of 0 to 1000 out of 0 to 1023. A vertical axis shows chromaticity.

Those diagrams show that the change in chromaticity is increased in the low gradation region due to an influence of light leakage (in actuality, the color looks lighter).

Further, the diagrams also show that such a change in chromaticity is not uniform in R, G, and B.

The problem caused by using one liquid crystal cell as described above is solved by adopting the dual cell configuration and using the configurations of FIGS. 4 and 5 described above in this embodiment.

In particular, a display gradation of the rear liquid crystal cell 3 on the backlight side (black-and-white side) is adjusted by the LUT conversion so as to use only a gradation range in which a change in the color gamut of the front liquid crystal cell 2 serving as a color cell is small.

Specifically, a method of improving the gradation performance color gamut by using the grayscale conversion performed by the grayscale conversion unit 70 and the LUT gradation conversion performed by the gamma conversion unit 72 and the LUT 73 will be described as image processing for the rear liquid crystal cell 3 as described in (1) to (5) below.

(1) Setting of Lower Limit Value Target by Checking Single Color Gradation Chromaticity of Front Liquid Crystal Cell 2

The coefficients kR, kB, and kG of the respective colors used in the grayscale conversion unit 70 are set.

For this, first, output chromaticity characteristics with respect to the input gradation of each single color in one cell (the front liquid crystal cell 2 in this embodiment) are checked. The characteristics are different between display panels, and thus it is desirable to check characteristics by using an actual apparatus.

Then, based on a result obtained as characteristics, an input gradation range (lower limit value target) in which the change in chromaticity is small is set.

Figure 8:
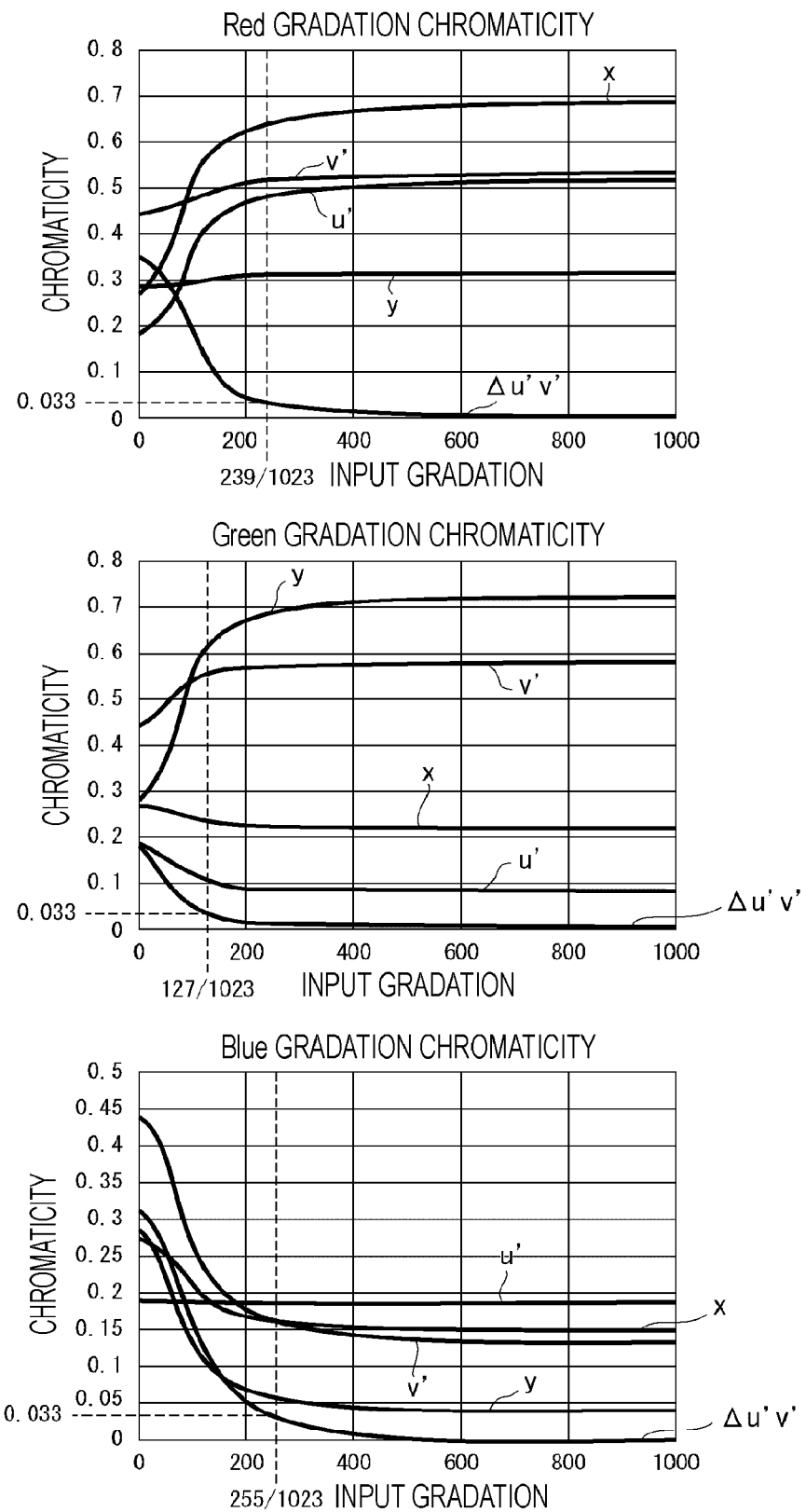
FIG. 8 is an explanatory diagram of gradations used for R, G, and B in an embodiment.

FIG. 8, as well as FIG. 7, illustrates the change in chromaticity with respect to the gradation at the time of outputting each of the single colors R, G, and B. As the lower limit value target, a lower limit of the input gradation range in which the change in chromaticity is small is determined. For example, in each single color, the lower limit value target is set to a gradation range up to Δu'v'=0.033 (10 JND). In this case, the lower limit value target is provisionally set as follows:

R_min gradation=239/1023
G_min gradation=127/1023
B_min gradation=255/1023.

(2) Provisional Setting of Grayscale Conversion Parameters for Rear Liquid Crystal Cell 3

Reciprocals of the lower limit values of the respective gradations set in the above (1) are defined as parameter coefficients kR, kG, and kB. Note that the reciprocals are divided by a denominator so that kR, kG, and kB become "1" in total.

$$kR=1/R\_\text{min gradation}/(1/R\_\text{min gradation}+1/G\_\text{min gradation}+1/B\_\text{min gradation})$$

$$kG = 1/G\_min\ gradation/(1/R\_min\ gradation + 1/G\_min\ gradation + 1/B\_min\ gradation)$$

$$kB = 1/B\_min\ gradation/(1/R\_min\ gradation + 1/G\_min\ gradation + 1/B\_min\ gradation)$$

When the above provisionally set R_min gradation, G_min gradation, and B_min gradation are substituted into those expressions, kR=0.26
kG=0.49
kB=0.25 are obtained. In this way, the coefficients kR, kG, and kB are provisionally set.

As a tendency of the coefficients, a color having a larger target lower limit value (a color that greatly changes in the low gradation region) has a smaller coefficient value (a lower rear output gradation).

(3) Setting of Target Input Gradation

It is determined up to which gradation value of the color image signal Sig_in serving as the input gradation the color gamut is secured.

When luminance is decreased, human beings hardly perceive color due to color vision characteristics of eyes (called scotopic vision to mesopic vision), which is not only for the liquid crystal panel.

Therefore, even if a color is reproduced in a low gradation equal to or lower than a gradation in which the color cannot be perceived, a sufficient effect of improvement in the image quality is hardly obtained. In other words, it is considered that an influence on the image quality is extremely small even if the color gamut is decreased in extremely low gradations.

Further, an increase in a gradation region for securing the color gamut is traded off against a problem of the image quality such as a double image. The double image is a phenomenon in which a viewer perceives a display image as if the display image is doubled due to a shadow of the rear liquid crystal cell 3.

Therefore, a sensory evaluation of an actual apparatus by visual observation is performed to determine up to which input gradation a single color gamut is secured.

For the sensory evaluation, there is used the liquid crystal display panel 1 that can secure a sufficient color gamut even at the time of the low gradation with the luminance of about 1000 [cd/m$^2$] when the input gradation is set to the maximum value with a panel gamma of 2.2.

The maximum value of the input gradation is a case where the R gradation=1023/1023, the G gradation=1023/1023, and the B gradation=1023/1023 are satisfied.

The sensory evaluation shows that a significant difference in the color gamut is reduced in a case where the input gradations of the single colors of R, G, and B are equal to or lower than 80/1023.

Figure 9:
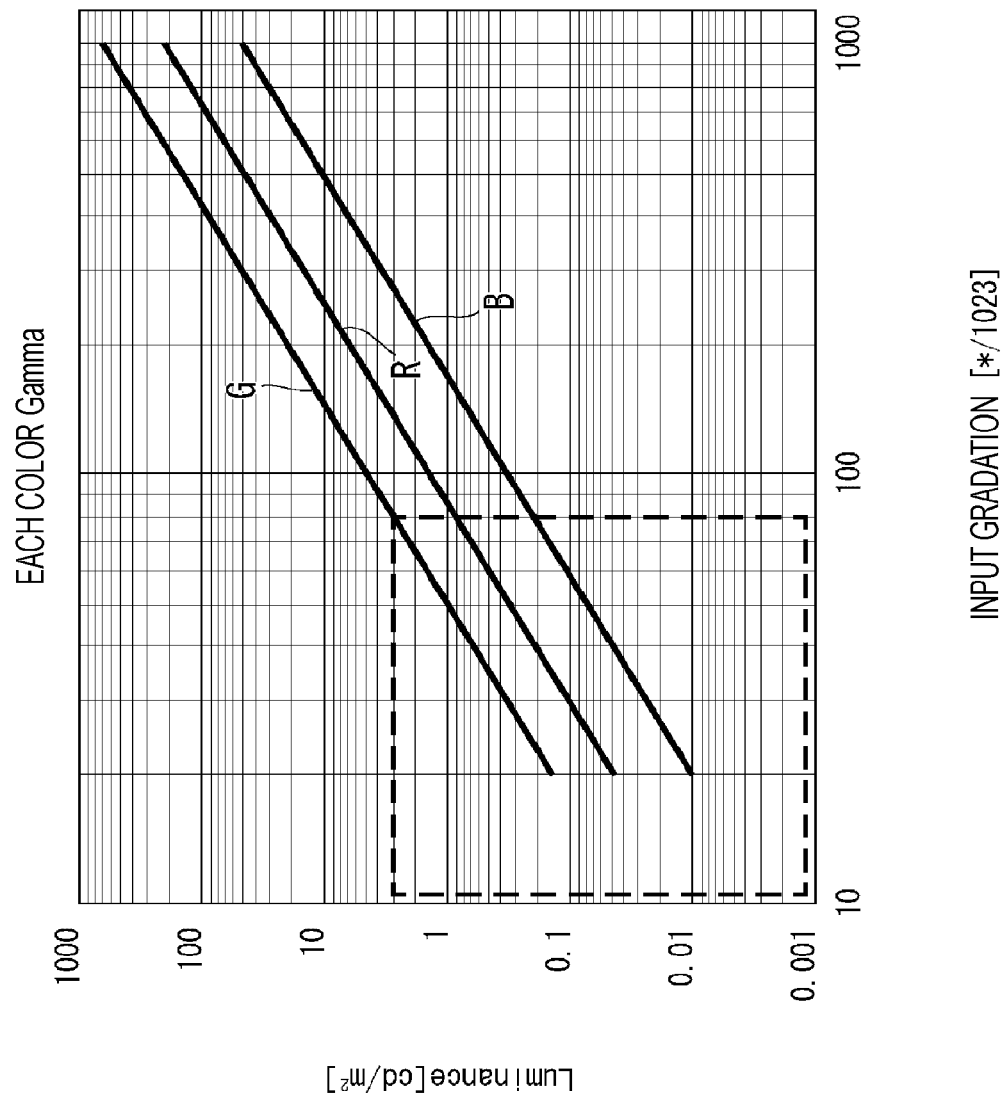
FIG. 9 is an explanatory diagram of gamma of each color obtained in a case where an input gradation is set to a maximum value with gamma of 2.2.

FIG. 9 illustrates gamma of each color obtained in a case where the input gradation is set to the maximum value with the panel gamma of 2.2.

In a range of the input gradation of 80/1023 or less and the luminance of 3 [cd/m$^2$] or less, which is surrounded by a broken line, the human eyes have a low sensitivity to color and therefore hardly perceive a difference even if the chromaticity changes. That is, an effect of a wide color gamut is hardly obtained in the input gradation of 80/1023 or less.

Thus, the input gradation of 80/1023 is provisionally set as the target input gradation.

(4) Setting of LUT for Gamma Conversion of Rear Liquid Crystal Cell 3

An LUT value (curve) is determined from the above provisionally set values in the above (1), (2), and (3) so as to satisfy conditions. A gradation relationship (chromaticity characteristics) between the front liquid crystal cell 2 and the rear liquid crystal cell 3 other than the target gradations changes depending on how the curve is formed, but this embodiment is limited to a region of the target gradations herein.

Herein, there will be described an example in which an LUT conversion setting is performed so as to obtain a lower limit value target gradation of the front liquid crystal cell 2 at the time of the single-color target input gradation (80/1023) of the above (3).

The following expressions are as follows.

The single-color target input gradation of the single color R, i.e., input of an R value=80/1023, a G value=0/1023, and a B value=0/1023 is expressed as "Sig_in (80, 0, 0)".

The single-color target input gradation of the single color G, i.e., input of the R value=0/1023, the G value=80/1023, and the B value=0/1023 is expressed as "Sig_in (0, 80, 0)".

The single-color target input gradation of the single color B, i.e., input of the R value=0/1023, the G value=0/1023, and the B value=80/1023 is expressed as "Sig_in (0, 0, 80)".

The grayscale signal Gr from the grayscale conversion unit 70 is expressed as "Gr(*)" ("*" denotes a value between 0 and 1023 indicating a gradation value of */1023).

The gradation value of the rear image signal Sig_RE is expressed as Sig_RE (*).

The gradation values of the LUT input signal LUT_in and the LUT output signal LUT_out are expressed as LUT_in (*) and LUT_out (*).

The gradation value of the front image signal Sig_FR is expressed as Sig_FR (*, *, *). "(*, *, *)" indicates (R value, G value, B value).

The input gradation value Sig_in(80, 0, 0) of the single color R is subjected to grayscale conversion by using the coefficients kR, kG, and kB that are provisionally set as described above, and thus becomes a grayscale signal Gray (21) having the gradation value of 21/1023.

Herein, the lower limit value target is provisionally set to R_min gradation=239/1023.

In order to obtain the front image signal Sig_FR=Sig_F (239, 0, 0), it is only necessary to obtain the rear image signal Sig_RE so that a division result of the R value in the division unit 52a is "239". Therefore, it is only necessary to obtain the rear image signal Sig_RE=Sig_RE (342) (herein, the coefficient of the light amount correction unit 53 is ignored for simplification of the description).

Therefore, it is only necessary to convert the grayscale signal Gray(21) into the rear image signal Sig_RE(342). Thus, LUT_in(21) →LUT_out(342) needs to be satisfied (the gradation value of 21/1023 needs to be converted into the gradation value of 342/1023) as a condition for the single color R.

The input gradation value Sig_in(0, 80, 0) of the single color G is subjected to grayscale conversion by using the provisionally set coefficients kR, kG, and kB, and thus becomes a grayscale signal Gray (39).

The lower limit value target is provisionally set to G_min gradation=127/1023.

In order to obtain the front image signal Sig_FR=Sig_F (0, 127, 0), it is only necessary to obtain the rear image signal Sig_RE (644) so that a division result of the G value in the division unit 52a is "127". Therefore, it is only necessary to convert the grayscale signal Gray (39) into the rear image signal Sig_RE (644), and thus LUT in (39)→LUT out (644) needs to be satisfied (the gradation value of 39/1023 needs to be converted into the gradation value of 644/1023) as a condition for the single color G.

The input gradation value Sig_in(0, 0, 80) of the single color B is subjected to grayscale conversion by using the provisionally set coefficients kR, kG, and kB, and thus becomes a grayscale signal Gray (20).

The lower limit value target is provisionally set to B_min gradation=255/1023.

In order to obtain the front image signal Sig_FR=Sig_F(0, 0, 255), it is only necessary to obtain the rear image signal Sig_RE (321) so that a division result of the B value in the division unit 52a is "255".

Therefore, it is only necessary to convert the grayscale signal Gray(20) into the rear image signal Sig_RE(321), and thus LUT_in(20) →LUT_out(321) needs to be satisfied (the gradation value of 20/1023 needs to be converted into the gradation value of 321/1023) as a condition for the single color B.

From the above, it is only necessary to design (provisionally set) the LUT 73 so that conversion is performed to satisfy LUT_in(21)→LUT_out(342) ... R single-color condition
LUT_in(39)→LUT_out(644) ... G single-color condition
LUT_in(20)→LUT_out(321) ... B single-color condition.

FIG. 10B illustrates a conversion curve of the input gradation (horizontal axis)—the output gradation (vertical axis) in the provisionally set LUT 73, and FIG. 10A is an enlarged view of a part of FIG. 10B (a part surrounded by a broken line).

In FIG. 10A, a point Rp, a point Gp, and a point Bp are shown on coordinates. The point Rp shows coordinates of LUT_in(21)→LUT_out(342) as the R single-color condition. Similarly, the points Gp and Bp show coordinates indicating LUT input/output values of the above G single-color condition and B single-color condition, respectively.

An approximate curve including the points Rp, Gp, and Bp is a provisional setting example of the LUT 73.

When the setting is performed by using a function of an approximate value, the above conditions are not always strictly satisfied, but the setting is effective in a case where the conditions are roughly satisfied.

Such input/output characteristics of the LUT 73 according to this embodiment do not define the shape of the conversion curve but are reference for determining a front and rear gradation relationship at the time of the low gradation. Thus, when the input/output characteristics of the LUT 73 are set to satisfy the above conditions, a target front gradation and chromaticity are obtained at the time of the low gradation, and the color gamut is secured.

Further, the characteristics serve as an element that affects not only the color gamut but also various characteristics such as a double image, a flare, and a contrast that are problems in image quality of two cells.

Note that, in the conversion curve of the LUT 73 in FIG. 10B, the output gradation value=1023/1023 is set in a region of approximately high input gradation values (for example, a region of 400 or more). This is because, in the high gradation region, gradation is expressed only by the front liquid crystal cell 2, whereas the rear liquid crystal cell 3 is opened.

As described above, in one liquid crystal panel, light leakage and a change in chromaticity may be increased in the low gradation region. In this embodiment, the light leakage and change in chromaticity are solved by the front liquid crystal cell 2 and the rear liquid crystal cell 3. In this case, the rear liquid crystal cell 3 serves as a complement for the low gradation region affected by light leakage and a change in chromaticity in the front liquid crystal cell 2. Thus, it is considered that an output gamma characteristic of the rear image signal Sig_RE preferably adjusts a gradation only in the low gradation region and is preferably transmitted (white) in the high gradation region in which no problem arises by using only the front liquid crystal cell 2. Therefore, as illustrated in FIG. 10B, LUT conversion is performed so as to open the rear liquid crystal cell 3 in the high gradation region.

(5) Confirmation of Output Gradation in Dual Cell Configuration

FIG. 11 illustrates an output gradation relationship between two liquid crystal cells under the above provisional setting conditions (1) to (4).

FIG. 11A illustrates the input/output characteristics of the rear liquid crystal cell 3, where a horizontal axis shows the input gradation value and a vertical axis shows the output gradation value. Herein, R, G, B, and white (W) are shown.

FIG. 11B illustrates the input/output characteristics of the front liquid crystal cell 2, where a horizontal axis shows the input gradation value and a vertical axis shows the output gradation value. Herein, R, G, and B are shown. FIG. 11C is an enlarged view of a low gradation region surrounded by a broken line in FIG. 11B.

Output gradation curves of the rear liquid crystal cell 3 and the front liquid crystal cell 2 in FIGS. 11A and 11B are changed by the above conversion curve of the LUT 73 in FIG. 10B. As can be seen from the enlarged view of FIG. 11C, the front image signal Sig_FR becomes output near the min gradation set for each single color in the input target gradation (80/1023), and becomes output equal to or larger than a min setting gradation in the input gradation equal to or larger than the input target gradation.

For example, in a case where the input target gradation of the single color R is (80/1023), the output gradation is near R_min gradation=239/1023.

In a case where the input target gradation of the single color G is (80/1023), the output gradation is near G_min gradation=127/1023.

In a case where the input target gradation of the single color B is (80/1023), the output gradation is near B_min gradation=255/1023.

Therefore, the change in chromaticity is suppressed within the set range, and the target color gamut is secured.

Meanwhile, as illustrated in FIG. 11A, the gradation in the low gradation region is expressed by the rear liquid crystal cell 3.

That is, as a concept, as illustrated in FIG. 8, the lower limit value target of the single color gradation chromaticity is set so that, in the front liquid crystal cell 2, color expression is suppressed in the low gradation region in which the chromaticity greatly changes in each of colors R, G, and B and a degree of the change is different therebetween. In addition, output of (near) the lower limit value target gradation is obtained in the front liquid crystal cell 2 in a case of the input target gradation of each of the single colors R, G, and B. The gradation expression in the low gradation region is performed by the rear liquid crystal cell 3.

According to the above consideration, the coefficients kR, kG, and kB of the grayscale conversion and the characteristics of the LUT 73 are set as described above in order to use a gradation range in which the change in chromaticity is small in the front liquid crystal cell 2. This suppresses a change in the color gamut.

As described above, this embodiment sets the coefficients kR, kG, and kB used for grayscale conversion processing in the grayscale conversion unit 70 and performs conversion using the LUT 73, thereby reducing a change in the color gamut caused by a gradation. This results in an increase in the color gamut in lower gradations, thereby improving the image quality.

Figure 12:
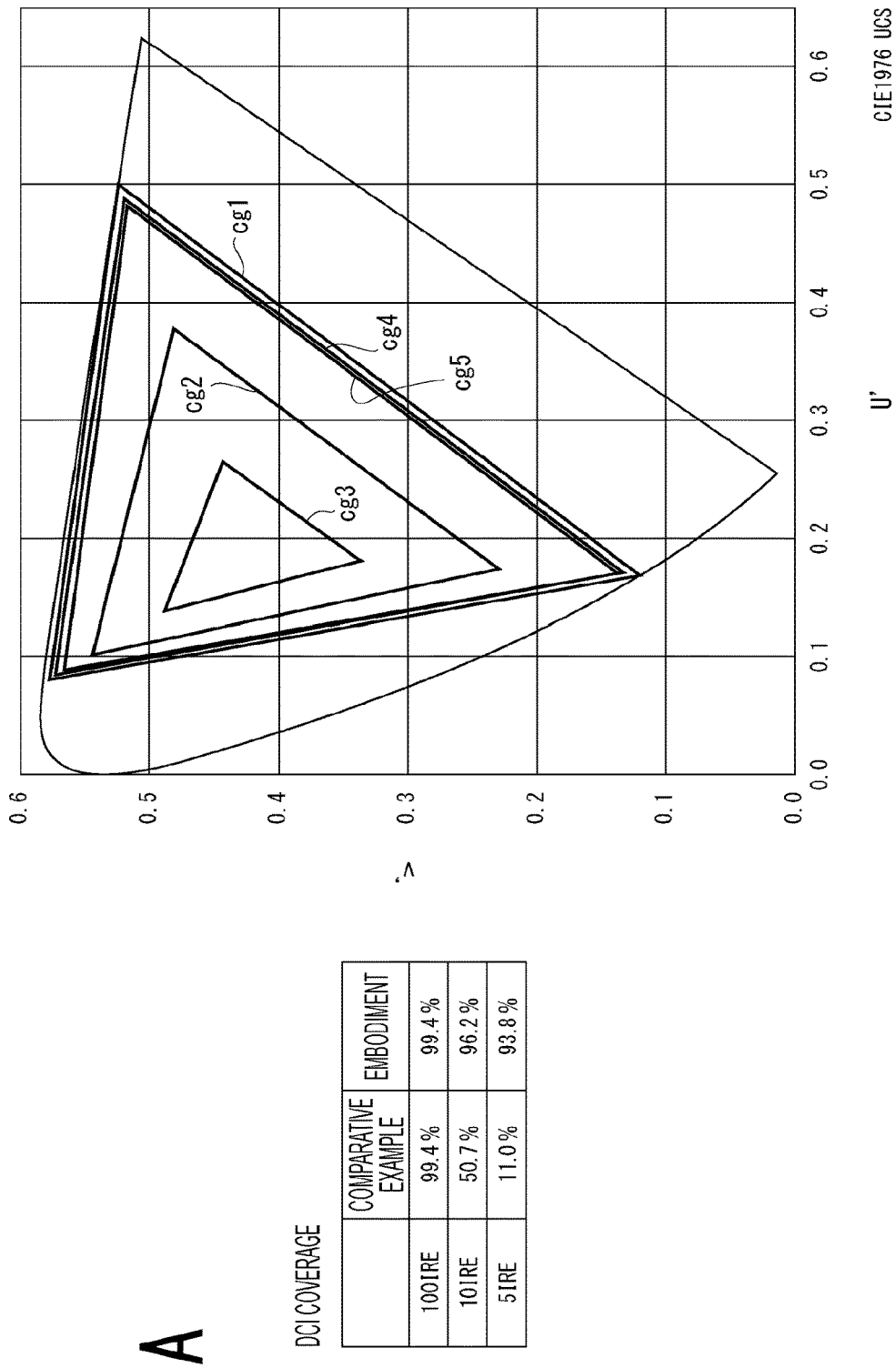
FIG. 12 is an explanatory diagram of a color gamut expansion effect in a low gradation region according to an embodiment.

FIGS. 12A and 12B illustrate examples of an improvement effect.

FIG. 12A illustrates DCI coverage in a comparative example and this embodiment. The comparative example is a case of a liquid crystal display panel having one liquid crystal cell.

Herein, coverage at luminance levels of 100 IRE, 10 IRE, and 5 IRE is shown.

FIG. 12B illustrates color gamuts Cg1, Cg2, Cg3, Cg4, and Cg5 in a u'v' chromaticity diagram. The color gamut Cg1 shows a case of 100 IRE, the color gamut Cg2 shows a case of the comparative example (10IRE), the color gamut Cg3 shows a case of the comparative example (5IRE), the color gamut Cg4 shows a case of the embodiment (10IRE), and the color gamut Cg5 shows a case of the embodiment (5IRE).

From those diagrams, it is possible to confirm a significant improvement in the color gamut in the low gradation in this embodiment.

<4. Conclusion and Modification Example>

In the above embodiment, the following effects can be obtained.

The image processing device (dual cell image processing unit 12) of the embodiment includes the grayscale conversion unit 70 (black-and-white conversion unit) that converts an image signal Sig_in serving as a color image signal for the liquid crystal display panel 1 in which a display image is generated by light passing through the rear liquid crystal cell 3 and the front liquid crystal cell 2 into a grayscale signal Gr (black-and-white image signal) by using the predetermined coefficients kR, kG, and kB. Further, the dual cell image processing unit 12 includes the gradation value conversion unit 72 that performs gradation value conversion so that the grayscale signal Gr obtained by the grayscale conversion unit 70 serves as a signal for performing gradation expression in a gradation region that is set as a gradation range in which the color gamut greatly changes in a case where the front liquid crystal cell 2 is driven by the color image signal, thereby generating a rear image signal Sig_RE serving as the black-and-white image signal for the rear liquid crystal cell 3. Further, the dual cell image processing unit 12 includes the front image generation unit 52 that performs arithmetic processing using the rear image signal Sig_RE on the image signal Sig_in, thereby generating a front image signal Sig_FR serving as the color image signal for the front liquid crystal cell 2.

With this configuration, for example, when gradation expression can be sufficiently performed in the low gradation region by the rear image signal Sig_RE, it is possible to achieve a state in which, regarding the front image signal Sig_FR, the gradation value in the low gradation region in which the color gamut greatly changes does not need to contribute the gradation expression. In other words, even if, in the front image signal Sig_FR, the gradation value in the low gradation region in which the color gamut greatly changes is not used, it is possible to obtain a display image in which gradation expression is sufficiently performed also in the low gradation region in the liquid crystal display panel 1. Therefore, in the embodiment, regarding the front image signal Sig_FR, the gradation region in which the color gamut is narrow is not used. This makes it possible to maintain the color gamut even in the low gradation region. That is, it is possible to improve the image quality because a change in the color gamut caused by a gradation is reduced and the color gamut is increased in lower gradations.

Further, a balance of a double image that is traded off against a necessary gradation color gamut can be maintained by performing the gradation value conversion using the LUT 73 and setting the coefficients kR, kG, and kB for the grayscale conversion in the grayscale conversion unit 70.

The grayscale conversion unit 70 according to the embodiment converts the color image signal into the black-and-white image signal by performing calculation using a coefficient calculated by using a lower limit value of a gradation value set for each color included in the color image signal.

That is, first, the lower limit values (R_min gradation, G_min gradation, and B_min gradation) of the gradation value of respective colors (for example, R, G, and B) included in the color image signal are set. That is, each lower limit values is a lower limit value of a gradation value of the front image signal Sig_FR. By using the lower limit values, the coefficients (kR, kG, and kB) for converting the color image into the black-and-white image are set. The black-and-white conversion unit converts the color image signal Sig_in into the black-and-white image signal (grayscale signal Gr) by calculation using the coefficients.

When the color image signal is converted into the black-and-white image signal in this way, image processing reflecting the lower limit values of the gradation values of the front image signal Sig_FR is realized. That is, in a case where a gradation region in which a change in the color gamut is small is used as the front image signal Sig_FR, it is possible to set the lower limit of the gradation region. When the lower limit values in the gradation region are appropriately selected, an effect of reducing the change in the color gamut is appropriately exhibited.

In particular, the embodiment shows an example in which the grayscale conversion unit 70 converts a color image signal into a black-and-white image signal by performing calculation using the coefficients kR, kG, and kB of R, G, and B, respectively, each of the coefficients being calculated by using the lower limit value of the gradation value set for each of R, G, and B.

That is, the lower limit values (R_min gradation, G_min gradation, and B_min gradation) of the gradation values of R, G, and B included in the color image signal are separately set. By using the lower limit values, the coefficients (kR, kG, and kB) for the gradation values of R, G, and B for converting the color image into the black-and-white image are set. The black-and-white conversion unit converts the color image signal Sig_in into the black-and-white image signal (grayscale signal Gr) by calculation using the coefficients.

The colors R, G, and B are different from each other in a degree of change in chromaticity in the low gradation region. Therefore, it is desirable to individually set the lower limit values of the gradation values of R, G, and B. When the coefficients for the respective gradation values of R, G, and B are set on the basis of the lower limit values of the respective gradation values of R, G, and B and grayscale conversion is performed by using the coefficients, it is possible to perform image processing in consideration of a difference in the change in the chromaticity between the colors. That is, it is possible to set processing in accordance with an actual value of a color gamut gradation range of each of R, G, and B in the front liquid crystal cell 3.

Further, the lower limit value described in the embodiment is a gradation value of each of R, G, and B at which the chromaticity changes to a predetermined value in the low gradation region.

In a case of the embodiment, the lower limit values (R_min gradation, G_min gradation, and B_min gradation) of the gradation values of R, G, and B are gradation values that satisfy $\Delta u'v'=0.033$ (10 JND). When the lower limit values of R, G, and B are set by using such a reference, it is possible to set coefficients in accordance with the change in the chromaticity in the low gradation region in each of R, G, and B. This makes it possible to improve accuracy of image processing so that the change in the chromaticity is reduced in the low gradation region.

In the embodiment, the gradation value conversion unit 72 performs the gradation value conversion by using the LUT 73 in which an output value is stored for an input value.

With a design of the LUT 73, it is possible to appropriately set the LUT output signal LUT_out for the LUT input signal LUT_in with a high degree of freedom. This makes it possible to accurately and easily realize the gradation value conversion in which the rear image signal serves as a signal for performing gradation expression in a gradation region set as a gradation range in which the color gamut greatly changes in the front liquid crystal cell.

In the embodiment, the lower limit value of the gradation value of each color included in the color image signal and a target input gradation (for example, 80/1023) of the gradation value of the color image signal are set, and the LUT 73 is set so that, when the color image signal having the target input gradation of a single color is input, the front image signal Sig_FR becomes the lower limit value of the single color.

When luminance is decreased, human beings hardly perceive color due to color vision characteristics of eyes. Therefore, in a case of an extremely low gradation, the image processing of the embodiment is not useful in some cases. Therefore, the target input gradation is set as the minimum gradation at which color can be perceived, and the LUT 73 is set so as to have the lower limit value in a case of the target input gradation. This makes it possible to improve the color gamut in a significant gradation region.

Further, the target input gradation is set as a maximum gradation value in a low gradation region in which human eyes hardly perceive a change in chromaticity.

For example, when a gradation in which human eyes hardly perceive a change in the color gamut is set as the target input gradation by sensory evaluation, it is possible to prevent unnecessary processing from being actually performed in a gradation region in which color gamut expansion is not useful.

In the embodiment, the front image generation unit 52 generates a front image signal by dividing the image signal Sig_in by the rear image signal Sig_RE.

That is, R, G, and B gradation values of the front image signal are obtained by, for example, dividing the gradation values of R, G, and B of the image signal Sig_in serving as the color image signal by the respective gradation values of the rear image signal Sig_RE.

By dividing the color image signal by the rear image signal, it is possible to obtain an appropriate gradation as an image in which the rear liquid crystal cell 3 and the front liquid crystal cell 2 are superimposed.

The embodiment shows an example in which the dual cell image processing unit 12 includes the light amount correction unit 53 that multiplies the rear image signal Sig_RE by the correction coefficient kLC corresponding to a light amount component incident on the front liquid crystal cell 2, and the front image generation unit 52 generates the front image signal Sig_FR by dividing the signal Sig_in by the rear image signal Sig_RE multiplied by the correction coefficient kLC.

It is possible to obtain the front image signal Sig_FR in consideration of the light amount component incident on the front liquid crystal cell 2 from the rear liquid crystal cell 3, and obtain an appropriate gradation as an image in which the rear liquid crystal cell 3 and the front liquid crystal cell 2 are superimposed.

The display apparatus 90 according to the embodiment includes: the dual-cell liquid crystal display panel 1 in which a display image is generated by light passing through a rear liquid crystal cell and a front liquid crystal cell; and the above-described dual cell image processing unit 12.

The liquid crystal display panel 1 includes the backlight 5, the rear liquid crystal cell 3, the diffusion layer 4, and the front liquid crystal cell 2 arranged in this order.

In such a dual-liquid-crystal-cell liquid crystal display panel 1, image processing for reducing a change in the color gamut in the low gradation region is realized by the dual cell image processing unit 12.

Note that the technology disclosed in this embodiment is not limited to the configuration and the setting method according to the above embodiment. The configuration example of the dual cell image processing unit 12, the setting example of the coefficients kR, kG, and kB coefficients used in the grayscale conversion unit 70, the setting example of the LUT 73, and the like can be variously modified.

Further, the technology of this embodiment is applied to a liquid crystal panel in which a color gamut greatly changes in a low gradation region. However, the technology of this embodiment is applicable not only to the low gradation region but also to a specific gradation region in which the color gamut changes.

Note that the effects described in the present specification are merely illustrative and are not limited. Further, additional effects may be obtained.

Note that the present technology can also be configured as follows.

(1)

An image processing device including:

a black-and-white conversion unit that converts a color image signal into a black-and-white image signal by using a predetermined coefficient, the color image signal being a signal for a display panel in which a display image is generated by light passing through a rear liquid crystal cell and a front liquid crystal cell;

a gradation value conversion unit that performs gradation value conversion so that the black-and-white image signal obtained in the black-and-white conversion unit serves as a signal for performing gradation expression in a gradation region set as a gradation range in which a color gamut greatly changes in a case where the front liquid crystal cell is driven by the color image signal, and generates a rear image signal serving as the black-and-white image signal for the rear liquid crystal cell; and a front image generation unit that performs arithmetic processing by using the rear image signal on the color image signal to generate a front image signal serving as the color image signal for the front liquid crystal cell.

(2)

The image processing device according to (1), in which the black-and-white conversion unit converts the color image signal into the black-and-white image signal by performing calculation using a coefficient calculated by using a lower limit value of a gradation value set for each color included in the color image signal.

(3)
The image processing device according to (2), in which
the color image signal includes gradation values of red, green, and blue; and
the black-and-white conversion unit converts the color image signal into the black-and-white image signal by performing calculation using coefficients of red, green, and blue, each of the coefficients being calculated by using a lower limit value of a gradation value set for each of red, green, and blue.

(4)
The image processing device according to (3), in which
the lower limit value is a gradation value of each of red, green, and blue at which chromaticity changes to a predetermined value in a low gradation region.

(5)
The image processing device according to any one of (1) to (4), in which
the gradation value conversion unit performs gradation value conversion by using a lookup table in which an output value is stored for an input value.

(6)
The image processing device according to (5), in which:
the lower limit value of the gradation value of each color included in the color image signal and a target input gradation of the gradation value of the color image signal are set; and
the lookup table is set so that, when the color image signal having the target input gradation of a single color is input, the front image signal becomes the lower limit value of the single color.

(7)
The image processing device according to (6) in which
the target input gradation is set as a maximum gradation value in a low gradation region in which human eyes hardly perceive a change in chromaticity.

(8)
The image processing device according to any one of (1) to (7), in which
the front image generation unit generates the front image signal by dividing the color image signal by the rear image signal.

(9)
The image processing device according to any one of (1) to (7), further including
a light amount correction unit that multiplies the rear image signal by a correction coefficient corresponding to a light amount component incident on the front liquid crystal cell, in which
the front image generation unit generates the front image signal by dividing the color image signal by the rear image signal multiplied by the correction coefficient in the light amount correction unit.

(10)
A display apparatus including:
a display panel in which a display image is generated by light passing through a rear liquid crystal cell and a front liquid crystal cell;
a black-and-white conversion unit that converts a color image signal for the display panel into a black-and-white image signal by using a predetermined coefficient;
a gradation value conversion unit that performs gradation value conversion so that the black-and-white image signal obtained in the black-and-white conversion unit serves as a signal for performing gradation expression in a gradation region set as a gradation range in which a color gamut greatly changes in a case where the front liquid crystal cell is driven by the color image signal, and generates a rear image signal serving as the black-and-white image signal for the rear liquid crystal cell; and
a front image generation unit that performs arithmetic processing by using the rear image signal on the color image signal to generate a front image signal serving as the color image signal for the front liquid crystal cell.

(11)
The display apparatus according to (10), in which
the display panel includes
a light source unit, the rear liquid crystal cell, a diffusion layer, and the front liquid crystal cell arranged in this order.

(12)
An image processing method performed by an image processing device, the method including:
a black-and-white conversion step of converting a color image signal into a black-and-white image signal by using a predetermined coefficient, the color image signal being a signal for a display panel in which a display image is generated by light passing through a rear liquid crystal cell and a front liquid crystal cell;
a gradation value conversion step of performing gradation value conversion so that the black-and-white image signal obtained in the black-and-white conversion step serves as a signal for performing gradation expression in a gradation region set as a gradation range in which a color gamut greatly changes in a case where the front liquid crystal cell is driven by the color image signal, and generating a rear image signal serving as the black-and-white image signal for the rear liquid crystal cell; and
a front image generation step of performing arithmetic processing by using the rear image signal on the color image signal to generate a front image signal serving as the color image signal for the front liquid crystal cell.

REFERENCE SIGNS LIST

1 Liquid crystal display panel
2 Front liquid crystal cell
3 Rear liquid crystal cell
4 Diffusion layer
5 Backlight
20 Front liquid crystal cell driving unit
30 Rear liquid crystal cell driving unit
51 Rear image generation unit
52 Front image generation unit
53 Light amount correction unit
54, 57 Panel gamma processing unit
55, 58 Adjustment unit
56 Rear output unit
57 Front output unit
70 Grayscale conversion unit
72 Gradation value conversion unit
73 LUT
74 Gamma conversion unit
75 Gradation maintaining unit
78 Combination unit
79 Spatial processing unit
90 Display apparatus

The invention claimed is:
1. An image processing device comprising:
circuitry configured to:
convert a color image signal into a black-and-white image signal based on a lower limit value of a gradation value set for each color included in the color image signal, the color image signal being for a display panel in which a display image is generated by light passing through a rear liquid crystal cell and a front liquid crystal cell;

perform gradation value conversion on the black-and-white image signal to generate a converted signal for performing gradation expression in a gradation region set as a gradation range;

generate a rear image signal based on the converted signal for the rear liquid crystal cell; and perform arithmetic processing on the color image signal based on the rear image signal to generate a front image signal for the front liquid crystal cell.

2. The image processing device according to claim 1, wherein the circuitry is configured to convert the color image signal into the black-and-white image signal by performing calculation using a coefficient calculated by using the lower limit value of the gradation value set for each color included in the color image signal.

3. The image processing device according to claim 2, wherein:

the color image signal includes gradation values of red, green, and blue; and the circuitry is configured to convert the color image signal into the black-and-white image signal by performing calculation using coefficients of red, green, and blue, each of the coefficients being calculated by using a lower limit value of a gradation value set for each of red, green, and blue.

4. The image processing device according to claim 3, wherein the lower limit value of the gradation value set for each of red, green, and blue is a gradation value of the respective one of red, green, and blue at which chromaticity changes to a predetermined value in a low gradation region.

5. The image processing device according to claim 1, wherein the circuitry is configured to perform the gradation value conversion by using a lookup table in which an output value is stored for an input value.

6. The image processing device according to claim 5, wherein:

the lower limit value of the gradation value of each color included in the color image signal and a target input gradation of the gradation value of the color image signal are set; and the lookup table is set so that, when the color image signal having the target input gradation of a single color is input, the front image signal becomes the lower limit value of the single color.

7. The image processing device according to claim 6, wherein the target input gradation is set as a maximum gradation value in a low gradation region in which human eyes hardly perceive a change in chromaticity.

8. The image processing device according to claim 1, wherein the circuitry is configured to generate the front image signal by dividing the color image signal by the rear image signal.

9. The image processing device according to claim 1, wherein the circuitry is configured to:

multiply the rear image signal by a correction coefficient corresponding to a light amount component incident on the front liquid crystal cell; and generate the front image signal by dividing the color image signal by the rear image signal multiplied by the correction coefficient.

10. A display apparatus comprising:

a display panel in which a display image is generated by light passing through a rear liquid crystal cell and a front liquid crystal cell; and circuitry configured to:

convert a color image signal for the display panel into a black-and-white image signal based on a lower limit value of a gradation value set for each color included in the color image signal;

perform gradation value conversion on the black-and-white image signal to generate a converted signal for performing gradation expression in a gradation region set as a gradation range;

generate a rear image signal based on the converted signal for the rear liquid crystal cell; and perform arithmetic processing on the color image signal based on the rear image signal to generate a front image signal for the front liquid crystal cell.

11. The display apparatus according to claim 10, wherein the display panel includes a light source, the rear liquid crystal cell, a diffusion layer, and the front liquid crystal cell arranged in this order.

12. An image processing method performed by an image processing device, the image processing method comprising:

converting a color image signal into a black-and-white image signal based on a lower limit value of a gradation value set for each color included in the color image signal, the color image signal being for a display panel in which a display image is generated by light passing through a rear liquid crystal cell and a front liquid crystal cell;

performing gradation value conversion on the black-and-white image signal to generate a converted signal for performing gradation expression in a gradation region set as a gradation range;

generating a rear image signal based on the converted signal for the rear liquid crystal cell; and performing arithmetic processing on the color image signal based on the rear image signal to generate a front image signal for the front liquid crystal cell.

* * * * *